(12) United States Patent
Honsho

(10) Patent No.: US 7,061,700 B2
(45) Date of Patent: Jun. 13, 2006

(54) LENS BARREL AND IMAGE PICKUP DEVICE INCLUDING LENS BARREL

(75) Inventor: Hironori Honsho, Himeji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/963,588

(22) Filed: Oct. 14, 2004

(65) Prior Publication Data

US 2005/0174657 A1    Aug. 11, 2005

(30) Foreign Application Priority Data

Feb. 5, 2004    (JP) .............................. 2004-029571

(51) Int. Cl.
*G02B 7/02* (2006.01)
(52) U.S. Cl. ........................ 359/824; 359/696; 359/699
(58) Field of Classification Search ................ 359/694, 359/696, 699–701, 824
See application file for complete search history.

(56) References Cited

U.S. PATENT DOCUMENTS 4,828,360 A * 5/1989 Maruyama ................... 359/824

FOREIGN PATENT DOCUMENTS

| JP | 60-146207 | 8/1985 |
|---|---|---|
| JP | 62-267711 | 11/1987 |
| JP | 5-196850 | 8/1993 |
| JP | 6-250068 | 9/1994 |
| JP | 2000-131586 | 5/2000 |

* cited by examiner

*Primary Examiner*—Hung X. Dang
*Assistant Examiner*—Joseph Martinez
(74) *Attorney, Agent, or Firm*—McDermott Will & Emery LLP

(57) ABSTRACT

A lens barrel for holding a lens group includes: a holding mechanism for movably holding the lens group in a direction parallel to an optical axis; an electromagnetic motor including a cylindrical stator with an axis parallel to the optical axis being taken as a center axis and a cylindrical rotor that is coaxial with the stator and rotates about the center axis with respect to the stator; a converting mechanism for converting a rotating motion of the rotor to a straight-ahead motion for allowing the holding mechanism to move the lens group in the direction parallel to the optical axis; and force applying means that applies a magnetic force to the rotor in the direction parallel to the optical axis.

43 Claims, 16 Drawing Sheets

LENS BARREL AND IMAGE PICKUP DEVICE INCLUDING LENS BARREL

TECHNICAL FIELD

Disclosed concepts relate to a lens barrel for holding optical elements, such as a lens element and an optical filter, and an image pickup device including such a lens barrel. More specifically, disclosed concepts relate to a lens barrel having incorporated therein an electromagnetic motor including a cylindrical rotor, and an image pickup device including such a lens barrel.

BACKGROUND

Digital still cameras and digital video cameras have been rapidly widespread, thanks to improvement in the degree of integration and low cost of image pick-up sensors and signal processing circuits, such as Charge Coupled Devices (CCDs) and Complementary Metal-Oxide Semiconductors (CMOS).

Also, in recent years, cellular phones, Personal Digital Assistants (PDAs), and other terminals having incorporated therein a digital camera have become quite popular. In the future, it is predicted that digital cameras will be further widespread also in the fields of monitor cameras and vehicle-mounted cameras.

Such a digital camera includes an image pickup device. In general, the image pickup device includes an optical system, a barrel, and an image pickup sensor.

Most digital cameras in recent years perform zooming and focusing in a motor-driven manner. Such motor-driven zooming and focusing are performed by using a motor to drive a mechanism of holding a predetermined lens element included in an optical system so as to move the lens element to a direction parallel to an optical axis.

However, when the holding mechanism is driven by a general-purpose brush less motor, a space has to be provided to the lens barrel for placing the motor, thereby increasing the size of the lens barrel. Moreover, a transmitting mechanism, such as a gear, for transmitting the rotation of the motor is required, thereby increasing the size of the lens barrel and generating noise.

In order to get around the problems, a technology is suggested in which the holding mechanism is driven by using an electromagnetic motor that includes a cylindrical stator with an optical axis of a lens element as a center axis and a cylindrical rotor that is coaxial with the stator (Japanese Patent Laid-Open Publication No. 2000-131586 and Japanese Patent No. 3232517).

With the use of such an electromagnetic motor including a cylindrical rotor, a space for placing a motor is not required. Also, the structure of the transmitting mechanism including a gear for transmitting the rotation of the motor can be simplified. Therefore, the lens barrel can be downsized in a direction perpendicular to the optical axis. Also, noise generated at the time of driving can be reduced.

In general, however, in such an electromagnetic motor including a cylindrical rotor, the rotation of the rotor has to be supported at a position away from the center of rotation. Therefore, the rotor is not stable in position with respect to the stator, and the positioning accuracy of the rotor is low.

In order to get around the problems, in the electromagnetic motor disclosed in Japanese Patent Laid-Open Publication No. 2000-131586, the length of a bearing portion for supporting the rotation of the rotor is increased in a direction parallel to the optical axis, thereby stabilizing the rotor in position. Therefore, in the lens barrel disclosed in Japanese Patent Laid-Open Publication No. 2000-131586, it is difficult to make the lens barrel compact in size in the direction parallel to the optical axis.

On the other hand, in the electromagnetic motor disclosed in Japanese Patent No. 3232517, a bearing for supporting the rotation of the rotor is provided between the rotor and the stator, thereby stabilizing the rotor in position. Therefore, in the lens barrel disclosed in Japanese Patent No. 3232517, it is difficult to make the lens barrel compact in size in the direction perpendicular to the optical axis.

As such, in the conventional lens barrel provided with an electromagnetic motor including a cylindrical rotor, it is difficult to make the lens barrel compact in size in the direction parallel or perpendicular to the optical axis.

SUMMARY

Disclosed concepts include a compact lens barrel including an electromagnetic motor that can be positioned with high accuracy, and a compact image pickup device including the above lens barrel.

The lens barrel includes a first lens frame for supporting a first lens group;

an first electromagnetic motor including a first cylindrical stator with an axis parallel to an optical axis being taken as a center axis and a first cylindrical rotor that is coaxial with the first cylindrical stator and rotates about the center axis with respect to the first cylindrical stator;

a first cam or rotational barrel operatively connected to the first lens frame for converting a rotating motion of the first cylindrical rotor to a linear motion for moving the first lens frame and first lens group in a direction parallel to the optical axis; and a first ferromagnetic material and a second ferromagnetic material positioned relative to opposing ends of the first cylindrical rotor for applying magnetic forces to the first cylindrical rotor in the direction parallel to the optical axis.

With the above structure, even though the length of the bearing in the direction parallel to the optical axis of the rotor of the electromagnetic motor is short, the rotor can always be maintained at a stable position with a force from the force applying means. Thus, a high positioning accuracy of the rotor can be achieved.

Also, the a compact lens can be achieved by a lens barrel for holding a first lens group and a second lens group as sharing an optical axis and being disposed in a direction parallel to the optical axis. The lens described above would further include:

a second frame for supporting a second lens groups;

a second electromagnetic motor including a cylindrical second stator with the optical axis being taken as the center axis and a second cylindrical rotor that is coaxial with the second stator and rotates about the center axis with respect to the second stator; and a second cam or rotational barrel for converting a rotating motion of the second rotor to a linear motion for moving the second frame and the second lens group in the direction parallel to the optical axis, wherein the first ferromagnetic material is disposed relative to an end of the first rotor for applying a first magnetic force to the first rotor in the direction parallel to the optical axis, and the second ferromagnetic material is disposed relative to an end of the second rotor for applying a second magnetic force to the second rotor in the direction parallel to the optical axis.

With the above structure, even though the length of the bearing in the direction parallel to the optical axis of the first and second rotors is short, each rotor can always be maintained at a stable position with a force from the relevant force applying means. Thus, a high positioning accuracy of each rotor can be achieved.

In yet another aspect, an image pickup device that outputs an electrical image signal representing an optical image of a subject may utilize the lens barrel described above. The image pickup device would further include an image pickup optical system including a first lens group for forming the optical image of the subject and an image pick up sensor for receiving the optical image formed by the image pickup optical system and converting the optical image to the electrical image signal.

As described above, a compact lens barrel including an electromagnetic motor that can be positioned with high accuracy can achieved. Also, a compact image pickup device including the above lens barrel can be achieved.

These and other features, aspects and advantages will become more apparent from the following detailed description when taken in conjunction with the accompanying drawings.

DESCRIPTION OF THE PREFERRED EMBODIMENTS

First Embodiment

Figure 1:
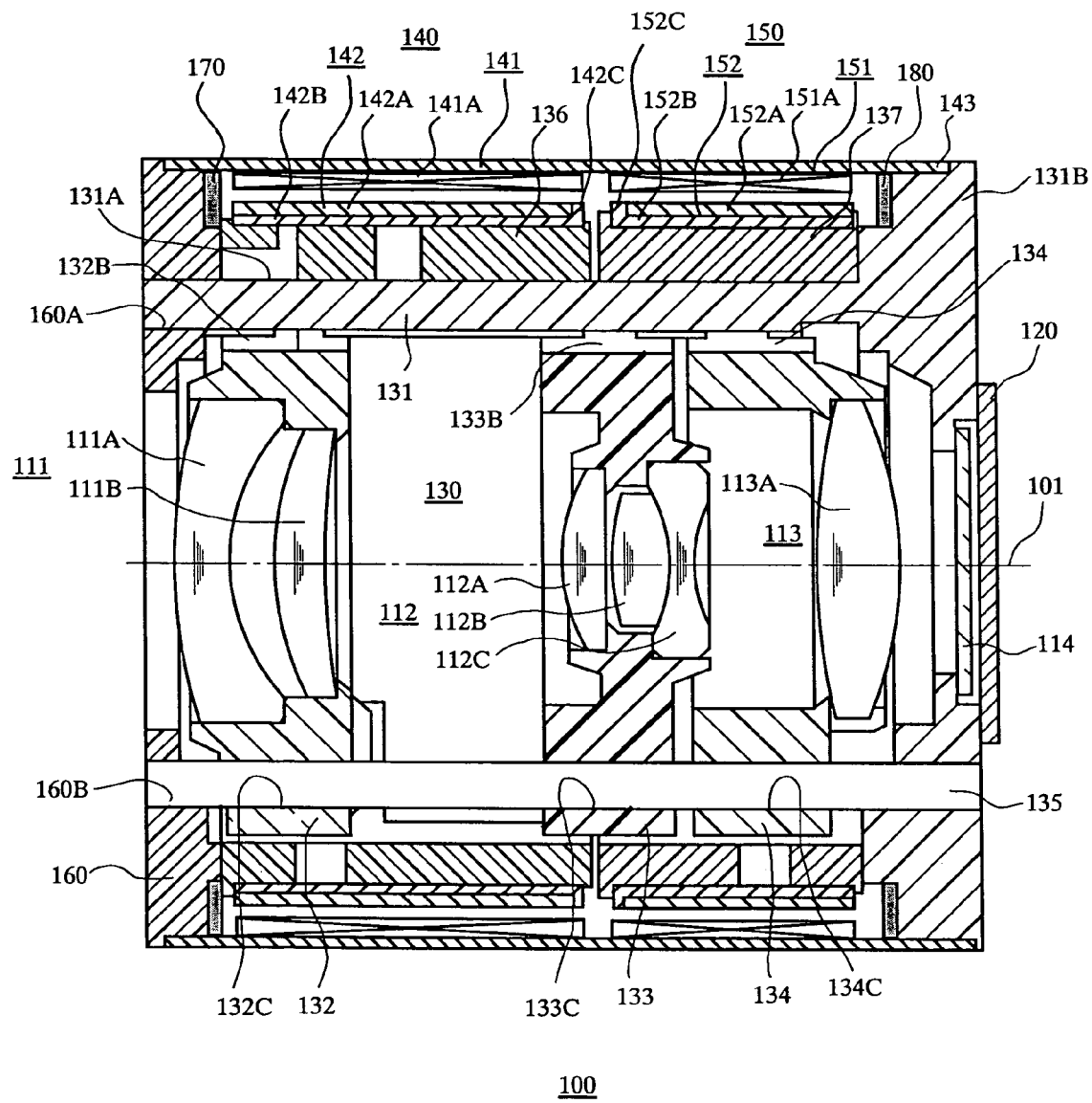
FIG. 1 is a longitudinal section view of an image pickup device according to a first embodiment.

FIG. 1 is a longitudinal section view of an image pickup device according to a first embodiment. In FIG. 1, an image pickup device 100 includes an optical system 110, an image pickup sensor 120, and a lens barrel 130.

The optical system 110 includes, from a subject side (at left in the drawing) to an image side (at right in the drawing) along an optical axis 101, a first zoom lens group 111, a second zoom lens group 112, a focus lens group 113, and a low-pass filter 114. The optical system 110 forms an optical image of the subject on the image pickup sensor 120.

The first zoom lens group 111 and the second zoom lens group 112 move along the optical axis so as to vary a space therebetween, thereby zooming in or out the optical image of the subject, that is, varying scaling of the optical image.

The first zoom lens group 111 includes a lens element 111A and a lens element 111B. The second zoom lens group 112 includes a lens element 112A, a lens element 112B, and a lens element 112C.

The focus lens group 113 moves along the optical axis to perform focusing so as to adjust an in-focus state of the optical image of the subject. The focus lens group 113 includes one lens element 113A.

The low-pass filter 114 has an optical characteristic of cutting a predetermined spatial frequency from the optical image of the subject. Based on this optical characteristic, the low-pass filter 114 reduces false color and moire of the optical image of the subject.

The image pickup sensor 120 is typically a CCD. The image pickup sensor 120 converts the optical image formed by the optical system 110 into an electrical image signal for output. The image pickup sensor 120 may be a CMOS.

The lens barrel 130 is configured based on a board 131. Inside the board 131, the lens barrel 130 includes a first lens frame 132, a second lens frame 133, a third lens frame 134, and a guide shaft 135. Outside the board 131, the lens barrel 130 includes a zoom-cam barrel 136, a focus-cam barrel 137, a zoom motor 140, and a focus motor 150. The lens barrel 130 also includes a front cover 160, a ferromagnetic plate 170, and a ferromagnetic plate 180.

Figure 2:
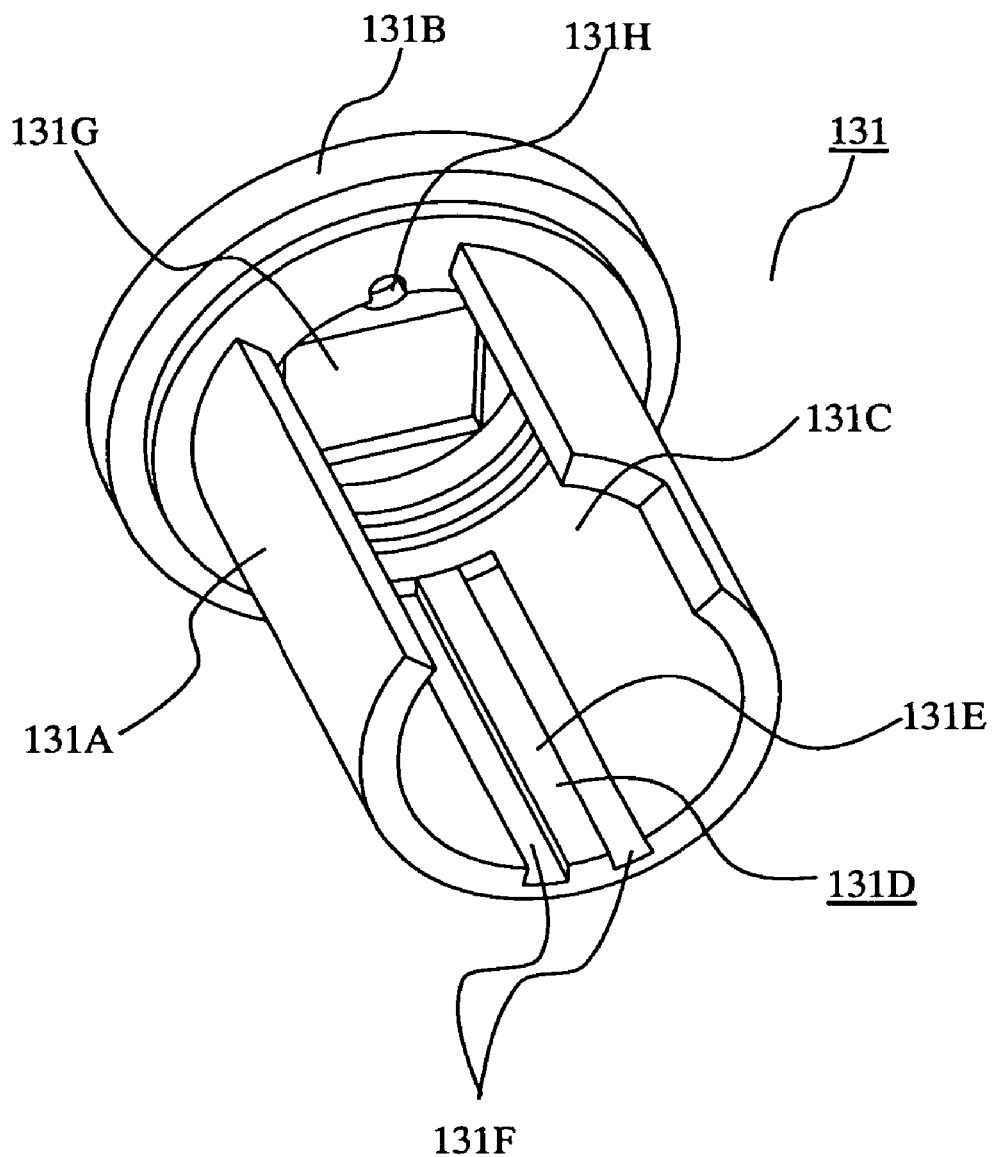
FIG. 2 is a perspective view of a board of the image pickup device according to the first embodiment.

FIG. 2 is a perspective view of the board 131 of the image pickup device according to the first embodiment. In FIG. 2, the board 131 includes a fixed barrel 131A and a flange portion 131B.

The fixed barrel 131A has a cylindrical shape having the optical axis 101 as a center axis and extending in parallel with the optical axis 101. The fixed barrel 131A has a notch portion 131C on its surface corresponding to a predetermined central angle. The central angle of the notch portion 131C is changed at a predetermined position away from the flange portion 131B so as to form a large opening area of the notch.

The fixed barrel 131A is provided on its inner surface with a guide portion 131D. The guide portion 131D includes a protruding portion 131E and groove portions 131F formed on left and right sides of the protruding portion 131E.

The flange portion 131B has a disk shape perpendicular to the optical axis 101. At the center of he flange portion 131B, a rectangular opening 131G is formed. In the opening 131G, the image pickup sensor 120 and the low-pass filter 114 are mounted. Also, the flange portion 131D has an aperture 131H for holding the guide shaft 16.

In FIG. 1, the first lens frame 132 holds the first zoom lens group 111. The second lens frame 133 holds the second zoom lens group 112. The third lens frame 134 holds the second zoom lens group 113.

The first lens frame 132 is provided on its edge with a through hole 132C penetrating therethrough in a direction parallel to the optical axis 101. The second lens frame 133 is provided on its edge with a through hole 133C penetrating therethrough in the direction parallel to the optical axis 101. The third lens frame 134 is provided on its edge with a through hole 134C penetrating therethrough in the direction parallel to the optical axis 101. The guide shaft 135 is disposed so as to penetrate the through holes 132C, 133C and 134C.

Figure 3:
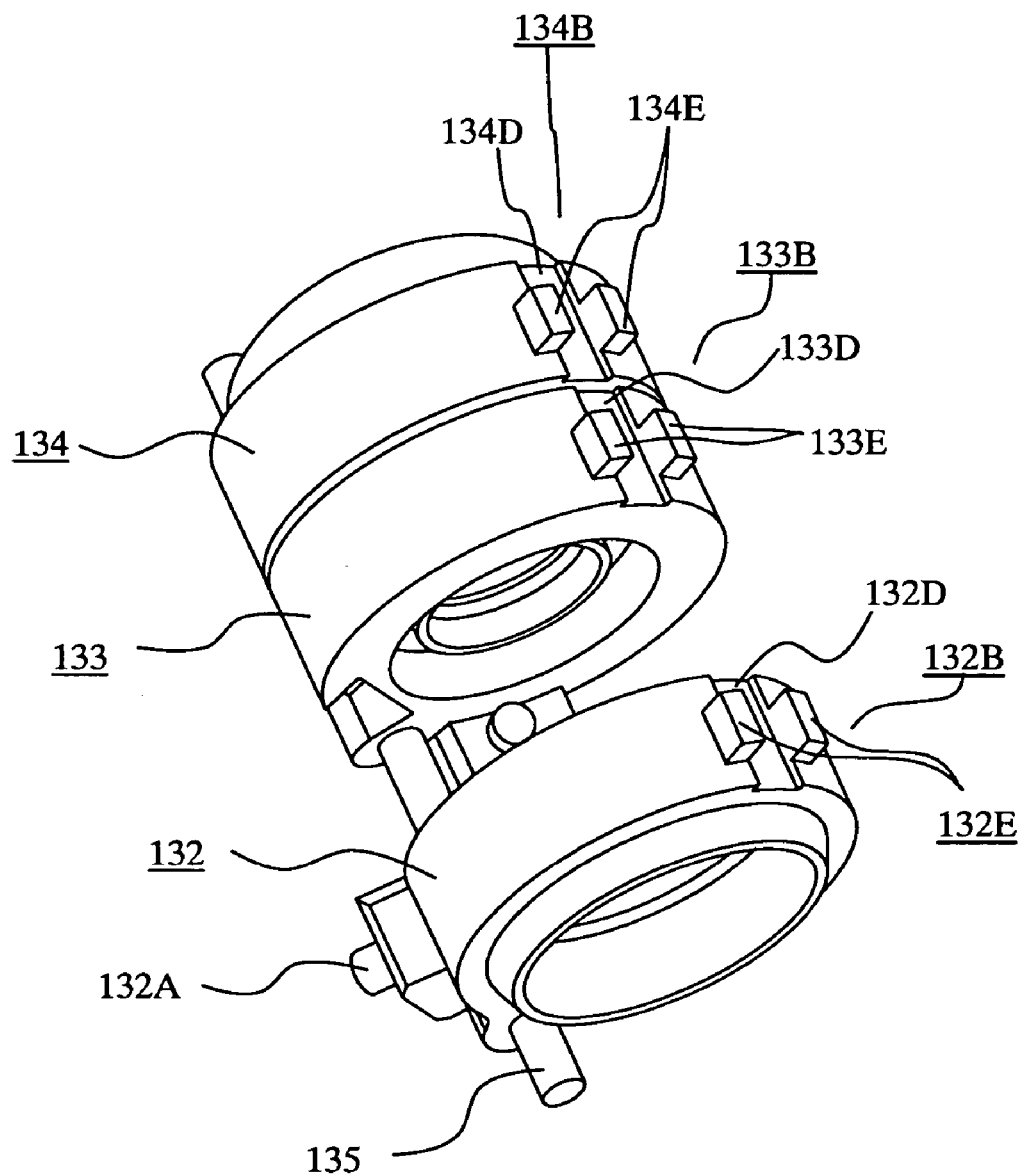
FIG. 3 is a perspective view of the lens frames of the image pickup device according to the first embodiment.

FIG. 3 is a perspective view of the lens frames of the image pickup device according to the first embodiment. In FIG. 3, the first lens frame 132 is provided with a rotation regulating portion 132B on the outer surface at a position opposite to the through hole 132C across the optical axis 101. The second lens frame 133 is provided with a rotation regulating portion 133B on the outer surface at a position opposite to the through hole 133C across the optical axis 101. The third lens frame 134 is provided with a rotation regulating portion 134B on the outer surface at a position opposite to the through hole 134C across the optical axis 101.

The rotation regulating portion 132B includes a groove portion 132D extending in a direction parallel to the optical axis 101 and a pair of protruding portions 132E formed on left and right sides of the groove portion 132D. The rotation regulating portion 133B includes a groove portion 133D extending in a direction parallel to the optical axis 101 and a pair of protruding portions 133E formed on left and right sides of the groove portion 133D. The rotation regulating portion 134B includes a groove portion 134D extending in a direction parallel to the optical axis 101 and a pair of protruding portions 134E formed on left and right sides of the groove portion 134D.

The groove portion 132D is connected to the protruding portion 131E of the guide portion 131D of the board 131. The protruding portions 132E are connected to the groove portions 131F of the guide portion 131D of the board 131.

The groove portion 133D is connected to the protruding portion 131E of the guide portion 131D of the board 131. The protruding portions 133E are fitted in the groove portions 131F of the guide portion 131D of the board 131.

The groove portion 134D is connected to the protruding portion 131E of the guide portion 131D of the board 131. The protruding portions 134E are fitted in the groove portions 131F of the guide portion 131D of the board 131.

With the rotational regulating portion of each lens frame being connected to the guide portion 131D of the board 131, each lens frame is regulated so as not to freely rotate about the guide shaft 135 on a plane perpendicular to the optical axis 101.

Figure 4:
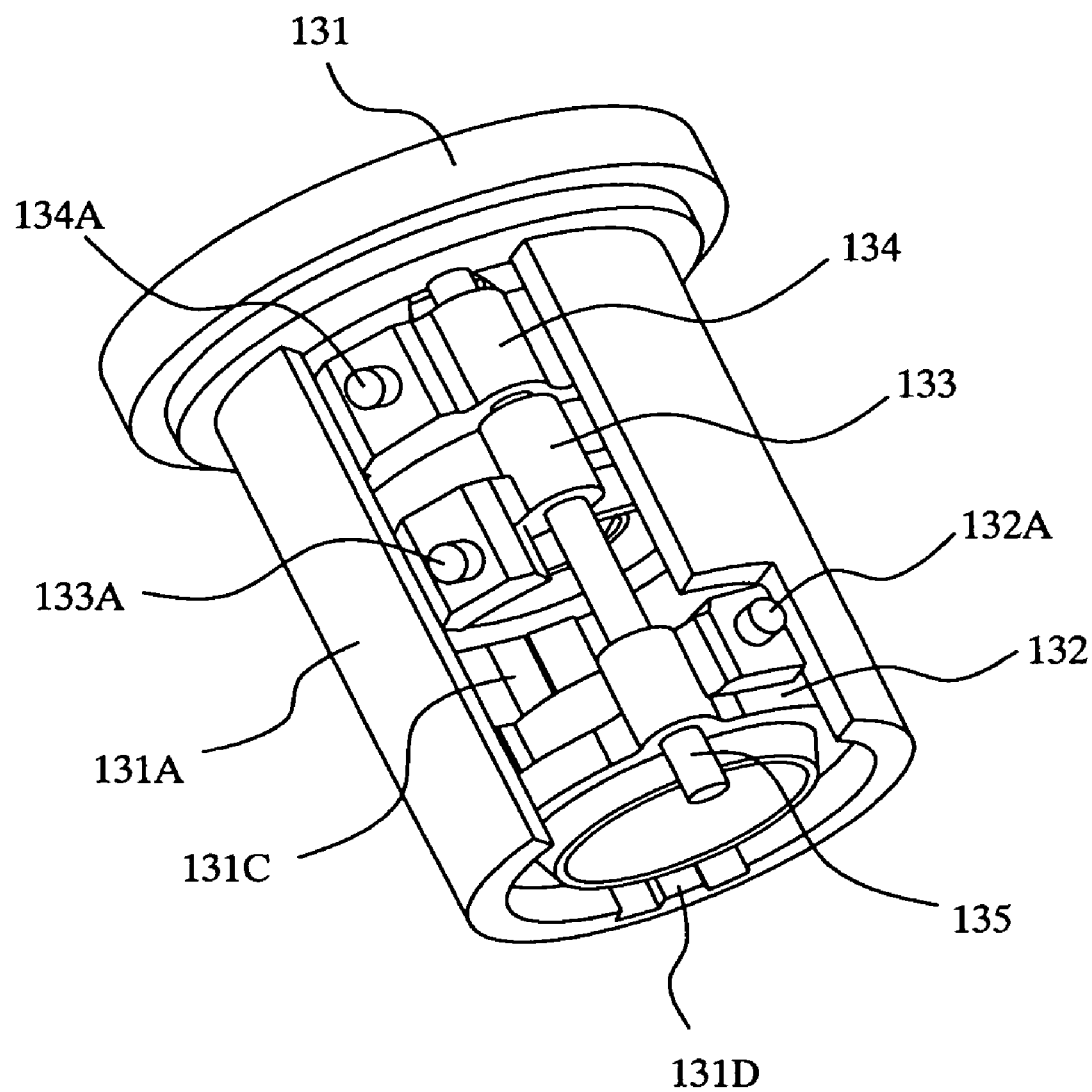
FIG. 4 is a perspective view showing a connecting state of the lens frames and the board of the image pickup device according to the first embodiment.

FIG. 4 is a perspective view showing a connecting state of the lens frames and the board of the image pickup device according to the first embodiment. In FIGS. 3 and 4, the first lens frame 132 is provided with a pin 132A at a predetermined position so as not to interfere with the through hole 132C and the rotation regulating portion 132B provided on the outer surface. The second lens frame 133 is provided with a pin 133A at a predetermined position so as not to interfere with the through hole 133C and the rotation regulating portion 133B provided on the outer surface. The third lens frame 134 is provided with a pin 134A at a predetermined position so as not to interfere with the through hole 134C and the rotation regulating portion 134B provided on the outer surface.

The guide shaft 135, the through holes of the lens frames and the pins of the lens frames are located in an area corresponding to the notch portion 131C of the board 131 so as to be exposed at its outer surface.

Figure 5:
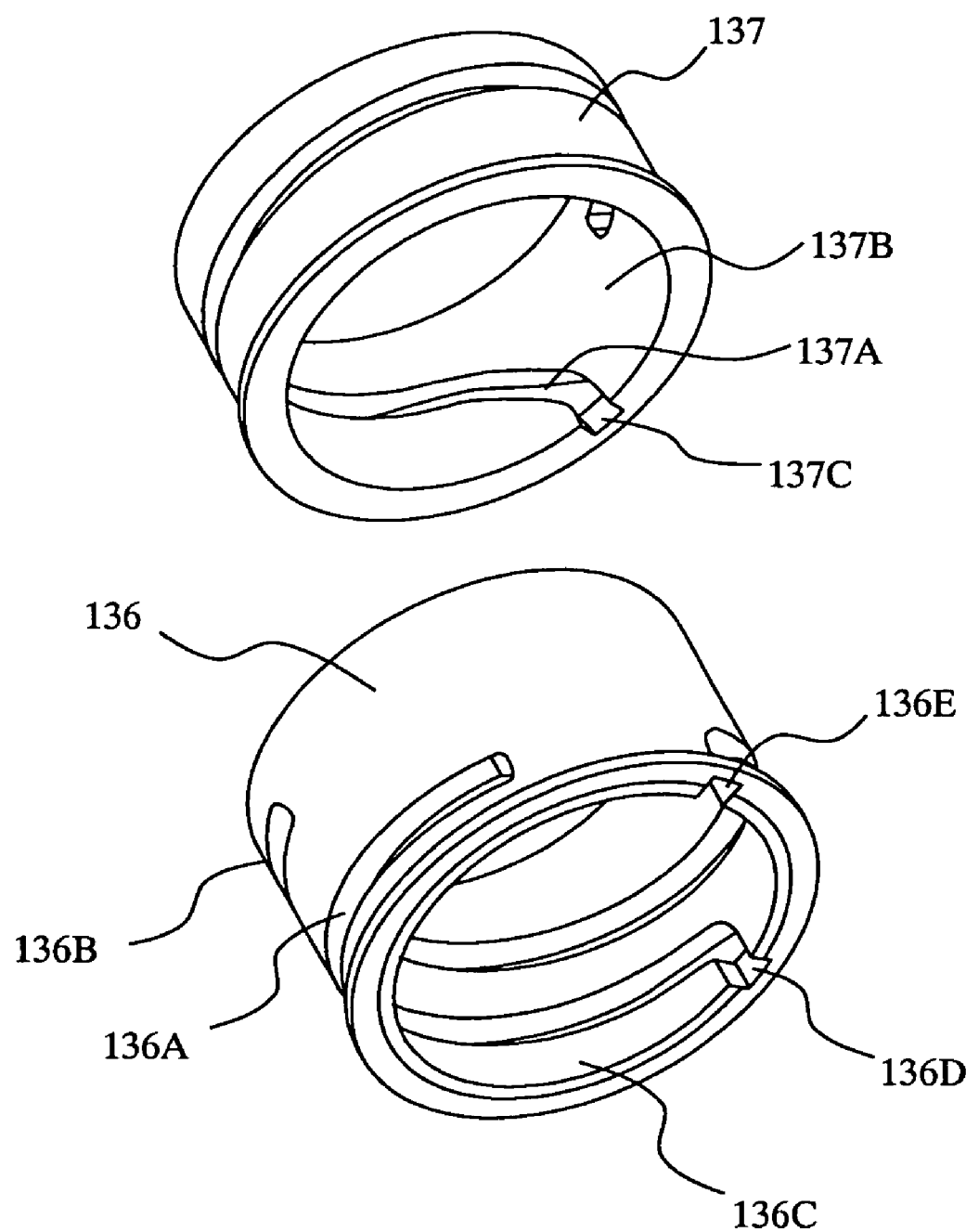
FIG. 5 is a perspective view of a zoom-cam barrel and a focus-cam barrel of the image pickup device according to the first embodiment.

In FIG. 1, the fixed barrel 131A of the board 131 is provided on its outer surface with the zoom-cam barrel 136 and the focus-cam barrel 137 with the optical axis 101 being taken as a central axis. FIG. 5 is a perspective view of the zoom-cam barrel and the focus-cam barrel of the image pickup device according to the first embodiment.

The zoom-cam barrel 136 includes a cam groove 136A and a cam groove 136B each having a predetermined shape. The cam grooves 136A and 136B are both penetrate the outer surface of the zoom-cam barrel 136. The cam groove 136A leads to a cam insertion opening 136D formed on one edge surface of the zoom-cam barrel 136 in a direction parallel to the optical axis. The cam groove 136B leads to a cam insertion opening 136E formed on the same edge surface of the zoom-cam barrel 136 so as not to interfere with the cam insertion opening 136D.

The focus-cam barrel 137 has a cam groove 137A having a predetermined shape. The cam groove 137 penetrates the outer surface of the focus-cam barrel 137. The cam groove 137A leads to a cam insertion opening 137C formed on one edge surface of the focus-cam barrel 137.

Figure 6:
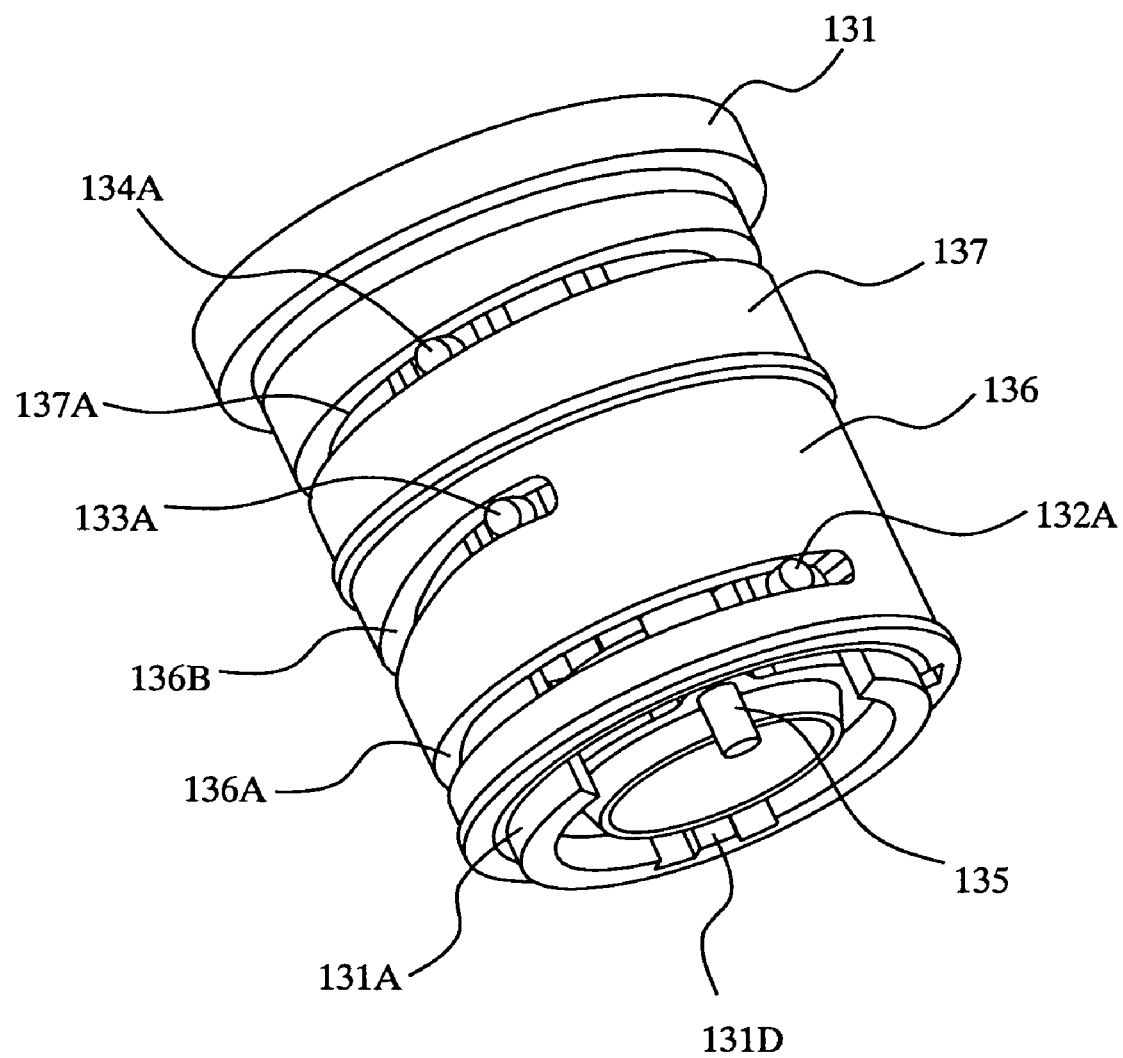
FIG. 6 is a perspective view showing a connecting state of the lens frames, the board, and the cam barrels of the image pickup device according to the first embodiment.

FIG. 6 is a perspective view showing a connecting state of the lens frames, the base, and the cam barrels of the image pickup device according to the first embodiment. In FIGS. 4 and 6, the pin 132A is fitted in the cam groove 134A. With this fitting, the first lens frame 132 is attached to the zoom-cam barrel 136. The pin 133A is fitted in the cam groove 136B. With this fitting, the second lens frame 133 is attached to the zoom-cam barrel 136. The pin 134A is fitted in the cam groove 137B. With this fitting, the third lens frame 134 is attached to the focus-cam barrel 137.

The fitting structure formed by the inner surface of the zoom-cam barrel 136 and the outer surface of the fixed barrel 131A of the board 131 serves as a bearing for rotation of the rotor 142 fixed to the zoom-cam barrel 132. Also, the fitting structure formed by the inner surface of the focus-cam barrel 137 and the outer surface of the fixed barrel 131A of the board 131 serves as a bearing for rotation of the rotor 152 fixed to the focus-cam barrel 137.

In FIG. 1, the zoom motor 140 includes a cylindrical stator 141 with the optical axis 101 being taken as a center axis and a cylindrical rotor 142 disposed inside the stator 141 with the optical axis 101 being taken as a center axis. The stator 141 is provided with a lens body 143 serving as a stator yoke and a stator coil 141A. The rotor 142 is provided with a rotor magnet 142A and a rotor yoke 142B. The rotor yoke 142B has a flange portion 142C for reducing a magnetic flux leaked from the edge of the rotor magnet 142A.

In FIG. 1, the focus motor 150 includes a cylindrical stator 151 with the optical axis 101 being taken as a center axis and a cylindrical rotor 152 disposed inside the stator 141 with the optical axis 101 being taken as a center axis. The stator 151 is provided with the lens body 143 serving as a stator yoke and a stator coil 151A. The rotor 152 is provided with a rotor magnet 152A and a rotor yoke 152B. The rotor yoke 152B has a flange portion 152C for reducing a magnetic flux from the edge of the rotor magnet 152A.

Figure 7:
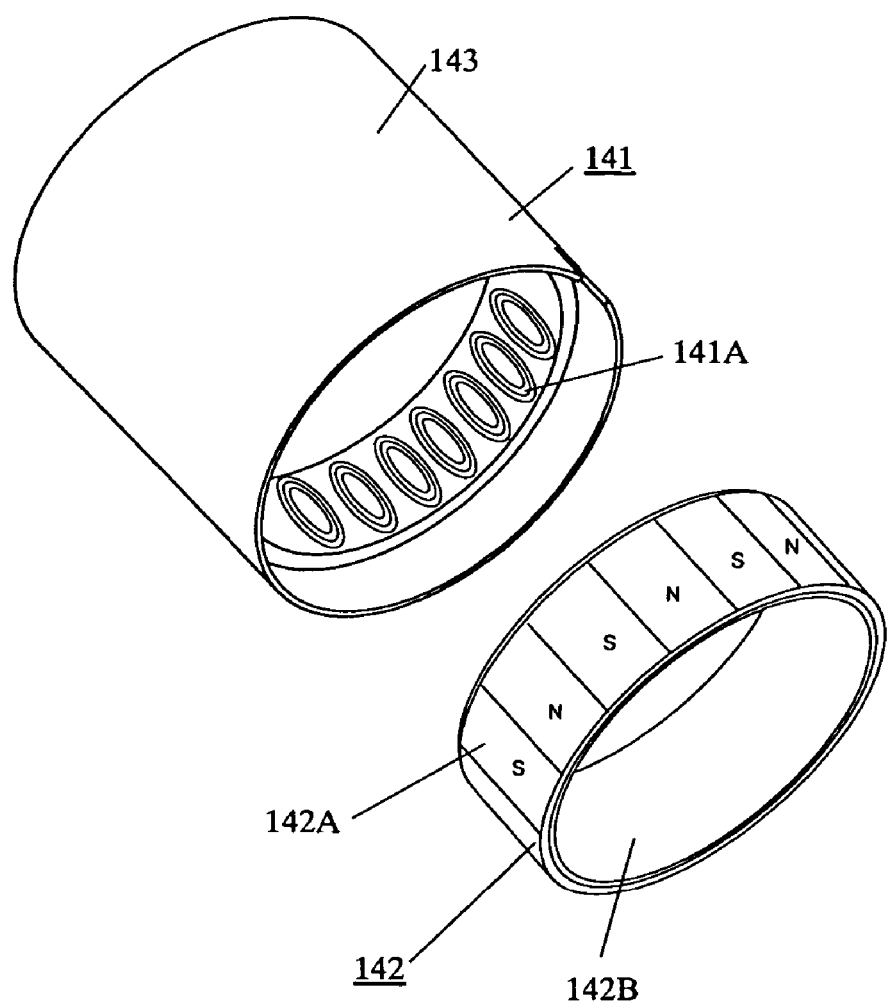
FIG. 7 is a perspective view schematically showing the structure of a zoom motor of the image pickup device according to the first embodiment.

FIG. 7 is a perspective view of the zoom motor of the image pickup device according to the first embodiment. In FIGS. 1 and 7, the stator coil 141A fixed to the inner surface of the lens body 143 is formed so that a plurality of spirally-wound small coils are disposed at a predetermined pitch along the inner surface of the lens body 143.

The lens body 143 is a ferromagnetic body typically formed of a flat-rolled magnetic steel sheet. The lens body 143 has a cylindrical shape extending in a direction parallel to the optical axis.

The rotor magnet 142A is typically implemented by a permanent magnet having magnetic poles as many as the number of small coils of the stator coil 141A. The magnetic poles are disposed in a manner such that N poles and S poles are alternately disposed along the perimeter of the rotor yoke 142B.

The rotor yoke 142B is adhered to the inner surface of the rotor magnet 142A. The rotor yoke 142B is typically formed of a ferromagnetic body, such as a flat-rolled magnetic steel sheet. The rotor yoke 142B is adhered to the outer surface of the zoom-cam barrel 136.

The stator 141 including the lens body 143 serving as a stator yoke and the stator coil 141A, the rotor magnet 142A, and the rotor yoke 142B form a magnetic circuit of the zoom motor 140. In the zoom motor 140, the magnetic circuit is driven by a current externally applied at a predetermined timing to the small coils of the stator coil 141A, thereby serving as an electromagnetic motor for rotating the rotor magnet 142A and the rotor yoke 142B.

In FIG. 7, the structure of the zoom motor 140 is shown. The focus motor 150 is similar in structure to the zoom motor 140.

That is, the stator coil 151A fixed to the inner surface of the lens body 143 is formed so that a plurality of spirally-wound small coils are disposed at a predetermined pitch along the inner surface of the lens body 143. The rotor yoke 152B is adhered to the outer surface of the focus-cam barrel 137. The rotor yoke 152B is typically formed of a ferromagnetic body, such as a flat-rolled magnetic steel sheet.

The rotor magnet 152A is adhered to the outer surface of the rotor yoke 152B. The rotor magnet 152A is typically implemented by a permanent magnet having magnetic poles as many as the number of small coils of the stator coil 151A. The magnetic poles are disposed in a manner such that N poles and S poles are alternately disposed along the perimeter of the rotor yoke 152B.

The stator 141 including the lens body 143 serving as a stator yoke, the stator coil 151A, the rotor magnet 152A, and the rotor yoke 152B form a magnetic circuit of the focus motor 150. In the focus motor 150, the magnetic circuit is driven by a current externally applied at a predetermined timing to the small coils of the stator coil 151A, thereby serving as an electromagnetic motor for rotating the rotor magnet 152A and the rotor yoke 152B.

In FIG. 1, a front cover 160 has a disk shape perpendicular to the optical axis 101. The front cover 160 is fixed to the image pickup device 100 at a position closest to the subject. The front cover 160 has a through hole 160B for supporting the guide shaft 135 and a fixing portion 160A to which an edge of the fixed barrel 131A on the subject side is fixed.

One edge of the lens body 143 on the subject side is supported by the front cover 160. Also, the other edge of the lens body 143 on the image side is supported by the flange portion 131B of the board 131. With the lens body 143 being supported by the front cover 160 and the board 131, the space between the stator coil 141A and the rotor magnet 142A and the space between the stator coil 151A and the rotor magnet 152A are appropriately maintained.

The ferromagnetic plate 170 has an annular shape, and is typically implemented by a ferromagnetic body, such as a flat-rolled magnetic steel sheet. The ferromagnetic plate 170 is fixed at a position opposite to the rotor magnet 142A in a direction parallel to the optical axis of the front cover 160 on the image side. The height of the ferromagnetic plate 170 in a direction perpendicular to the optical axis is approximately equal to a height between the inner surface of the lens body 143 and the outer surface of the zoom-cam barrel 136.

Between the ferromagnetic plate 170 and the rotor magnet 142A of the rotor 142, magnetic attraction occurs. With this magnetic attraction, a force is always applied to the rotor 142 in a direction parallel to the optical axis 101 toward the subject side. That is, the rotor magnet 142A and the ferromagnetic plate 170 form means that applies force to the rotor 142.

The ferromagnetic plate 180 is typically implemented by a ferromagnetic body, such as a flat-rolled magnetic steel sheet, having an annular shape. The ferromagnetic plate 180 is fixed at a position opposite to the rotor magnet 152A in a direction parallel to the optical axis of the flange portion 131B on the subject side. The height of the ferromagnetic plate 180 in a direction perpendicular to the optical axis is approximately equal to a height between the inner surface of the lens body 143 and the outer surface of the focus-cam barrel 137.

Between the ferromagnetic plate 180 and the rotor magnet 152A of the rotor 152, magnetic attraction occurs. With this magnetic attraction, a force is always applied to the rotor 152 in a direction parallel to the optical axis 101 toward the image side. That is, the rotor magnet 152A and the ferromagnetic plate 180 form means that applies a force to the rotor 152.

The rotor 142 is applied with a force toward the subject side, while the rotor 152 is applied with a force toward the image side. That is, the rotor 142 is applied with a force in a direction away from the rotor 152.

In the above-described structure, when zooming is performed, a driving current is externally applied to the small coils of the stator coil 141A of the zoom motor 140 at a predetermined timing. With the driving current being applied, the magnetic circuit is driven to cause the rotor 142 to rotate about the optical axis by the force from the force applying means always toward the subject side.

With the rotor 142 rotating about the optical axis, the zoom-cam barrel 136 rotates about the optical axis. With the zoom-cam barrel 136 rotating about the optical axis, the pin 132A provided on the first lens frame 132 is guided along the cam groove 136A in which the pin 132A is fitted. Also, with the zoom-cam barrel 136 rotating about the optical axis, the pin 133A provided on the second lens frame 133 is guided along the cam groove 136B in which the pin 133A is fitted.

Since the rotation regulating portion 132B is fitted in the guide portion 131D of the board 131, the first lens frame 132 is regulated so as not to freely rotate about the guide shaft 135 on a plane perpendicular to the optical axis 101. Therefore, when the zoom-cam barrel 136 rotates about the optical axis, the rotating motion is converted to a straight-ahead motion, thereby causing the first lens frame 132 to move in a direction parallel to the optical axis in accordance with the phase of the cam groove 136A.

Also, since the rotation regulating portion 133B is fitted in the guide portion 131D of the board 131, the second lens frame 133 is regulated so as not to freely rotate about the guide shaft 135 on a plane perpendicular to the optical axis 101. Therefore, when the zoom-cam barrel 136 rotates about the optical axis, the rotating motion is converted to a straight-ahead motion, thereby causing the second lens frame 133 to move in a direction parallel to the optical axis in accordance with the phase of the cam groove 136B.

As such, the lens barrel 130 includes a holding mechanism for movably holding the first zoom lens group 111 in the direction parallel to the optical axis 101. This holding mechanism includes the fixed barrel 131A of the board 131, the first lens frame 132, and the guide shaft 135.

Also, the lens barrel 130 includes a converting mechanism for converting a rotating motion of the rotor 142 to a straight-ahead motion so as to cause the second zoom lens group 112 to move in the direction parallel to the optical axis 101. This converting mechanism includes the zoom-cam barrel 136 and the pin 132A provided on the first lens frame 132.

Furthermore, the lens barrel 130 includes a holding mechanism for movably holding the second zoom lens group 112 in the direction parallel to the optical axis 101. This holding mechanism includes the fixed barrel 131A of the board 131, the second lens frame 133, and the guide shaft 135.

Still further, the lens barrel 130 includes a converting mechanism for converting a rotating motion of the rotor 142 to a straight-ahead motion so as to cause the second zoom lens group 112 to move in the direction parallel to the optical axis 101. This converting mechanism includes the zoom-cam barrel 136 and the pin 133A provided on the second lens frame 133.

With the first lens frame 132 and the second lens frame 133 moving, the first zoom lens group 111 and the second zoom lens group 112 move, while changing a space therebetween, to each predetermined position in the direction parallel to the optical axis. As a result, the image pickup device 100 can perform zooming.

When focusing is performed, a driving current is externally applied to the small coils of the stator coil 151A of the focus motor 150 at a predetermined timing. With the driving current being applied, the magnetic circuit is driven to cause the rotor 152 to rotate about the optical axis by the force from the force applying means always toward the image side.

With the rotor 152 rotating about the optical axis, the focus-cam barrel 137 also rotates about the optical axis. With the focus-cam barrel 137 rotating about the optical axis, the pin 134A provided on the third lens frame 134 is guided along the cam groove 137A in which the pin 134A is fitted.

Since the rotation regulating portion 134B is fitted in the guide portion 131D of the board 131, the third lens frame 134 is regulated so as not to freely rotate about the guide shaft 135 on a plane perpendicular to the optical axis 101. Therefore, when the focus-cam barrel 137 rotates about the optical axis, the rotating motion is converted to a straight-ahead motion, thereby causing the third lens frame 134 to move in a direction parallel to the optical axis in accordance with the phase of the cam groove 137A.

As such, the lens barrel 130 includes a holding mechanism for movably holding the focus lens group 112 in the direction parallel to the optical axis 110. This holding mechanism includes the fixed barrel 131A of the board 131, the second lens frame 133, and the guide shaft 135.

Also, the lens barrel 130 includes a converting mechanism for converting a rotating motion of the rotor 152 to a straight-ahead motion so as to cause the focus zoom lens group 113 to move in the direction parallel to the optical axis 101. This converting mechanism includes the zoom-cam barrel 136 and the pin 134A provided on the first lens frame 134.

With the third lens frame 134 moving, the focus zoom lens group 113 moves to a predetermined position in the direction parallel to the optical axis. As a result, the image pickup device 100 performs focusing.

Since the zoom motor 140 and the focus motor 150 can be independently driven, various control can be performed. Normally, the zoom motor 150 is first driven for zooming, and then an image signal output from the image pickup sensor 120 is analyzed. Then, the focus lens group 113 is moved for focusing to a position that offers a highest contrast to an image of the image signal.

After focusing is performed, so-called continuous auto focusing (AF) control may be performed such that an image signal output from the image pickup sensor 120 is analyzed at predetermined intervals for sequential focusing. Alternatively, so-called one-shot auto focusing (AF) control may be performed such that focusing is performed only at a predetermined timing.

The above-described lens barrel 130 is assembled as follows.

(1) Assembly of the Cam Barrels

First, the rotor yoke 142B is fixed to the outer surface of the zoom-cam barrel 136, and then the rotor magnet 142A is fixed onto the rotor yoke 142B. Similarly, the rotor yoke 152B is fixed to the outer surface of the zoom-cam barrel 137, and then the rotor magnet 152A is fixed onto the rotor yoke 152B.

(2) Connection Between the Focus-Cam Barrel and the Third Lens Frame

Next, the assembled focus-cam barrel 137 is connected to the fixed barrel 131A of the board 131 with the guide shaft 135 and the ferromagnetic plate 180 being mounted in advance, so as to make contact with the outer surface of the fixed barrel 131A. Next, the third lens frame 134 with the focus lens group 113 being mounted in advance is inserted in the fixed barrel 131A so as to make contact with the inner surface of the fixed barrel 131A.

At this time, the third lens frame 134 is inserted in the fixed barrel 131A from the subject side so that the rotation regulating portion 134B of the third lens frame 134 is connected to the guide portion 131D of the board 131 and the guide shaft 135 penetrates the through hole 134C of the third lens frame 134. When the pin 134A of the third lens frame 134 reaches the focus-cam barrel 137, the pin 134A is fitted into the cam groove 137A from the cam insertion opening 137C.

(3) Connection Between the Zoom-Cam Barrel and the First and Second Lens Frames

Furthermore, the assembled zoom-cam barrel 136 is connected to the fixed barrel 131A of the board 131 so as to make contact with the outer surface of the fixed barrel 131A. Next, the second lens frame 133 with the second zoom lens group 112 being mounted in advance is inserted in the fixed barrel 131A so as to make contact with the inner surface of the fixed barrel 131A. At this time, the rotation regulating portion 133B of the second lens frame 133 is connected to the guide portion 131D of the board 131. Also, the guide shaft 135 penetrates the through hole 133C of the second lens frame 133 so as to insert the second lens frame 133 into the fixed barrel 131A from the subject side. When the pin 133A of the second lens frame 133 reaches the zoom-cam barrel 136, the pin 133A is fitted into the cam groove 136B from the cam insertion opening 136A.

The first lens frame 132 with the first zoom lens group 111 being mounted in advance is assembled in a manner similar to the above-described manner such that the pin 132A is fitted into the cam groove 136A from the cam insertion opening 136 so as to insert the first lens frame 132 in the fixed barrel 131A (4) Mounting of the Lens Body and the Front Cover Next, the lens body 143 with the stator coil 141A and the stator coil 151A being adhered to the inner surface in advance is inserted and adhered to a predetermined position on the flange portion 131B of the board 131. Furthermore, the front cover 160 with the ferromagnetic plate 170 being fixed in advance is mounted. Then, the guide shaft 135, the fixed barrel 131A of the board 131, and the lens body 143 are adhered to the front cover 160. With the above-described assembling scheme, the lens barrel 130 is assembled.

As described above, the lens barrel 130 of the image pickup device 100 according to the first embodiment includes the force applying means that applies a force to the rotor 142 of the zoom motor 140 in the direction parallel to the optical axis toward the subject side. Therefore, even though the length of the bearing in the direction parallel to the optical axis is short, the rotor 142 can always be maintained at a stable position with respect to the stator 141. Thus, a high positioning accuracy of the rotor 142 can be achieved.

Also, only with the ferromagnetic plate 170 being added, the force applying means can obtain a force. Therefore, the lens barrel 130 does not have to be made large in directions parallel and perpendicular to the optical axis.

In particular, the ferromagnetic plate 170 forming the force applying means has an annular shape. Therefore, a force can be uniformly applied to the entire perimeter of the rotor 142 about the optical axis in the direction parallel to the optical axis. Thus, the rotor 142 can be maintained at a stable position with respect to the stator 141.

Similarly, the lens barrel 130 of the image pickup device 100 according to the first embodiment includes the force applying means that applies a force to the rotor 152 of the focus motor 150 in the direction parallel to the optical axis toward the image side. Therefore, even though the length of the bearing in the direction parallel to the optical axis is short, the rotor 152 can always be maintained at a stable position with respect to the stator 151. Thus, a high positioning accuracy of the rotor 152 can be achieved.

Also, only with the ferromagnetic plate 180 being added, the force applying means can obtain a force. Therefore, the lens barrel 130 does not have to be made large in directions parallel and perpendicular to the optical axis.

In particular, the ferromagnetic plate 180 forming the force applying means has an annular shape. Therefore, a force can be uniformly applied to the entire perimeter of the rotor 152 about the optical axis in the direction parallel to the optical axis. Thus, the rotor 152 can be maintained at a stable position with respect to the stator 151.

Furthermore, in the lens barrel 130 of the image pickup device 100 according to the first embodiment, the force applying means for the rotor 142 and the force applying means for the rotor 152 apply forces so as to cause both of the force applying means to be away from each other. As such, each rotor can be independently stabilized in position with respect to the relevant stator. In the image pickup device 100 according to the first embodiment, the flange portion 142C is opposite in position to the flange portion 152C, thereby preventing magnetic interference from occurring between the rotor magnet 142A and the rotor magnet 152A. Thus, the rotors can be disposed adjacently to each other, there by making the lens barrel short in the direction of the optical axis 101.

As such, according to the lens barrel 130 of the image pickup device 100 of the first embodiment, it is possible to provide a compact lens barrel with magnetic motors including cylindrical rotors that can be positioned with high accuracy.

Also, according to the image pickup device 100 of the first embodiment, it is possible to provide a compact image pickup device including the above-described lens barrel.

Second Embodiment

Figure 8:
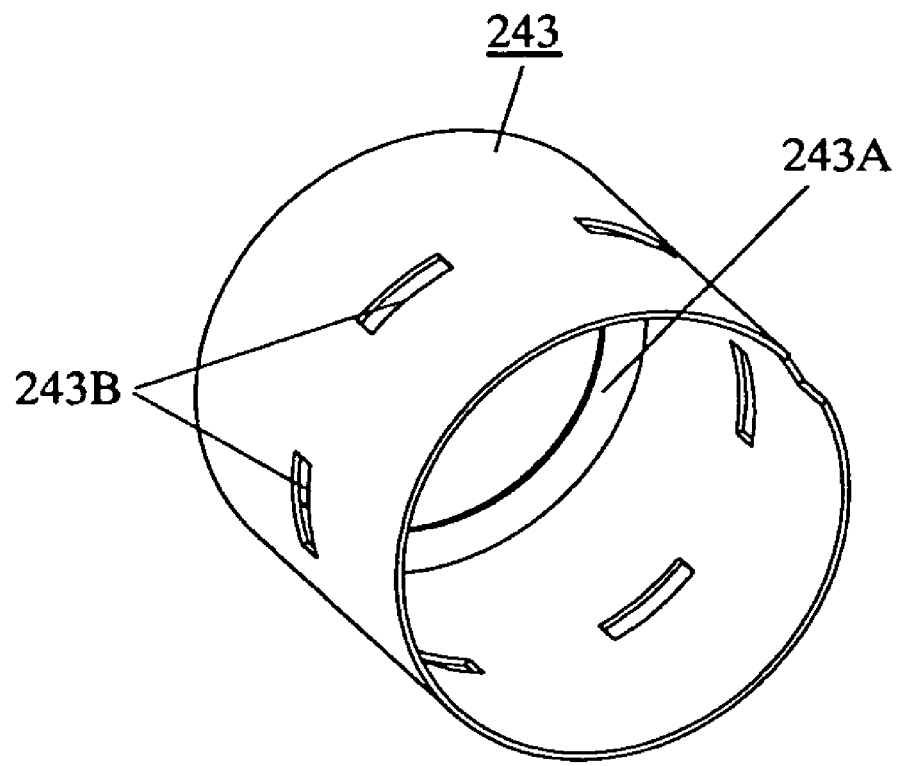
FIG. 8 is a perspective view of a lens body included in a lens barrel of an image pickup device according to a second embodiment.

FIG. 8 is a perspective view of a lens body included in a lens barrel of an image pickup device according to a second embodiment. Note that the image pickup device according to the second embodiment has a structure similar to that of the image pickup device 100 according to the first embodiment. In the second embodiment, only the components different from those in the first embodiment are described.

In FIG., 8, a lens body 243 is typically implemented by a ferromagnetic body, such as a flat-rolled magnetic steel sheet. The lens body 143 has an approximately cylindrical shape extending along a direction parallel to the optical axis.

The lens body 243 includes a stator protruding portion 243A extending from the edge of the lens body 243 and being bent in a direction perpendicular to the direction parallel to the optical axis. Also, the lens body 243 is provided on its perimeter with six notch portions 243B each having a predetermined length.

Figure 9:
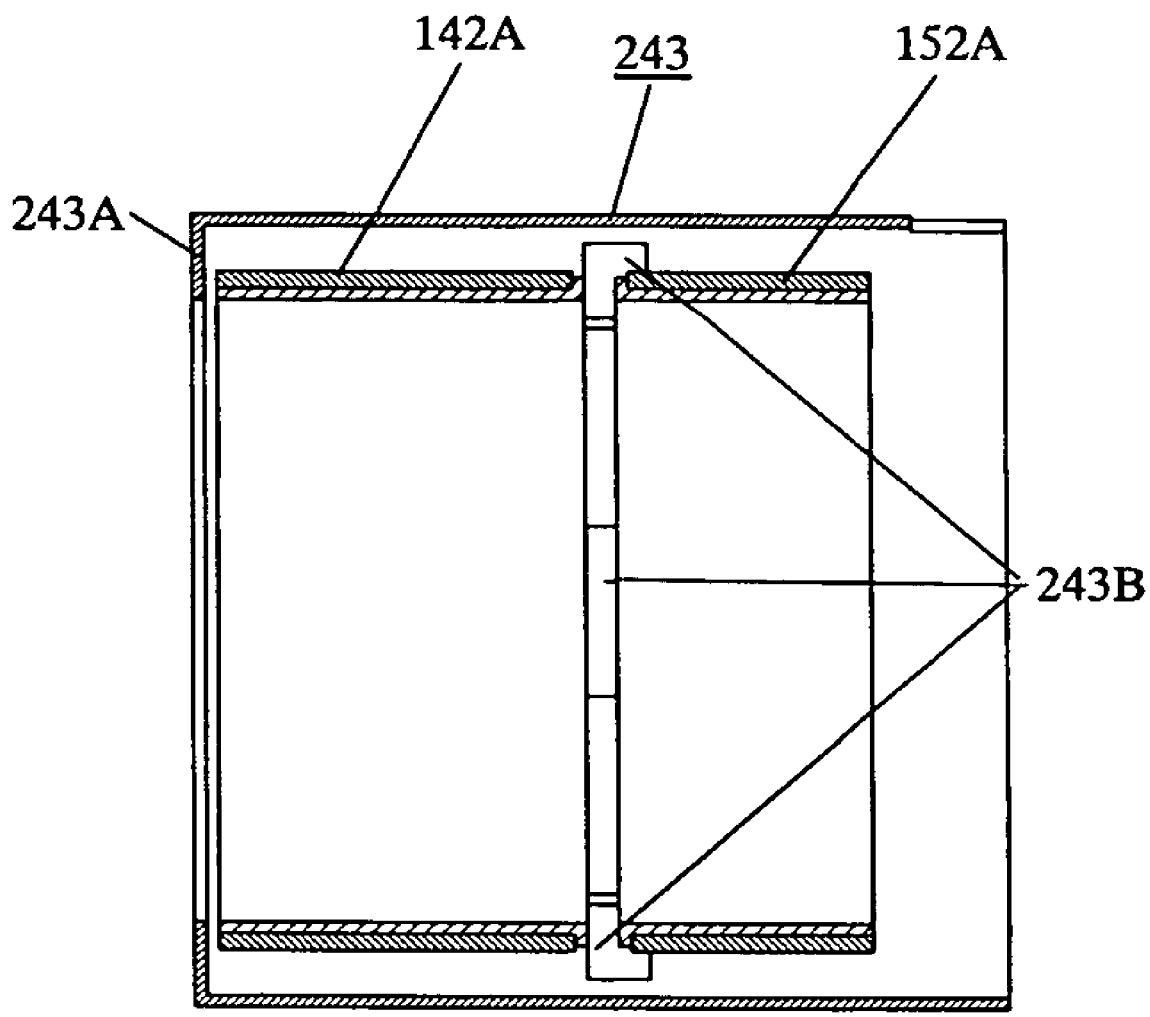
FIG. 9 is a section view showing a relation between a lens body and rotors included in the lens barrel of the image pickup device according to the second embodiment.

FIG. 9 is a section view showing a relation between the lens body and the rotors included in the lens barrel of the image pickup device according to the second embodiment. In FIG. 9, the stator protruding portion 243A is opposite in position to the rotor magnet 142A of the rotor 142 having an annular shape in a direction parallel to the optical axis. Also, the notch portions 243B are opposite in position to a portion where the rotor 142 and the rotor 152 are disposed adjacently to each other.

Also, with the lens body 243 being typically implemented by a ferromagnetic body, magnetic attraction occurs between the stator protruding portion 243A and the rotor magnet 142A of the rotor 142. Therefore, as with the ferromagnetic plate 170 in the first embodiment, the stator protruding portion 243A and the rotor magnet 142A cooperatively form force-applying means.

Also, in FIG. 9, the notch portions 243B are opposite in position to the portion where the rotor 142A and the rotor 152A are disposed adjacently to each other. With this structure, the magnetic flux density is low only in an area extending from the rotor magnet 142A and the rotor magnet 152A to the lens body 243 serving as a stator yoke.

Here, between the rotor magnet 142A and the rotor magnet 152A, magnetic attraction occurs in a direction from a low magnetic flux density to a high magnetic flux density. Thus, the rotor 142 and the rotor 152 are applied with forces so as to be away from the notch portions 243B.

Therefore, the notch portions 243B and the rotor magnet 142A form force applying means that applies a force to the rotor 142 in a direction parallel to the optical axis toward the subject side. Also, the notch portions 243B and the rotor magnet 152A form force applying means that applies a force to the rotor 152 in a direction parallel to the optical axis toward the image side.

As described above, the lens barrel of the image pickup device according to the second embodiment includes the force applying means that applies a force to the rotor 142 of the zoom motor 140 in the direction parallel to the optical axis toward the subject side. Therefore, even though the length of the bearing in the direction parallel to the optical axis is short, the rotor 142 can always be maintained at a stable position with respect to the stator 141. Thus, a high positioning accuracy of the rotor 142 can be achieved.

Also, the force applying means can be achieved without increasing the number of components. Therefore, the lens barrel 130 does not have to be made large in directions parallel and perpendicular to the optical axis.

In particular, the stator protruding portion 243A forming the force applying means has an annular shape. Therefore, a force can be uniformly applied to the entire perimeter of the rotor 142 about the optical axis in the direction parallel to the optical axis. Thus, the rotor 142 can be maintained at a stable position with respect to the stator 141.

Similarly, the lens barrel 130 of the image pickup device 100 according to the second embodiment includes the force applying means that applies a force to the rotor 152 of the focus motor 150 in the direction parallel to the optical axis to the image side. Therefore, even though the length of the bearing in the direction parallel to the optical axis is short, the rotor 152 can always be maintained at a stable position with respect to the stator 151. Thus, a high positioning accuracy of the rotor 152 can be achieved.

Also, the force applying means can be achieved without increasing the number of components. Therefore, the lens barrel 130 does not have to be made large in directions parallel and perpendicular to the optical axis.

In particular, the notch portions 243B forming the force applying means are provided on the rotor 142 and the rotor 152 at a predetermined space about the optical axis. Therefore, a force can be uniformly applied to the entire perimeter of the rotor 142 and the rotor 152 about the optical axis in the direction parallel to the optical axis. Thus, the rotor 142 can be maintained at a stable position with respect to the stator 141, and also the rotor 152 can be maintained at a stable position with respect to the stator 151.

Furthermore, in the lens barrel 130 of the image pickup device 100 according to the second embodiment, the force applying means for the rotor 142 and the force applying means for the rotor 152 apply forces so as to cause both of the force applying means to be away from each other. As such, each rotor can be independently stabilized in position with respect to the relevant stator.

As such, according to the lens barrel 130 of the image pickup device 100 of the second embodiment, it is possible to provide a compact lens barrel with magnetic motors including cylindrical rotors that can be positioned with high accuracy.

Third Embodiment

Figure 10:
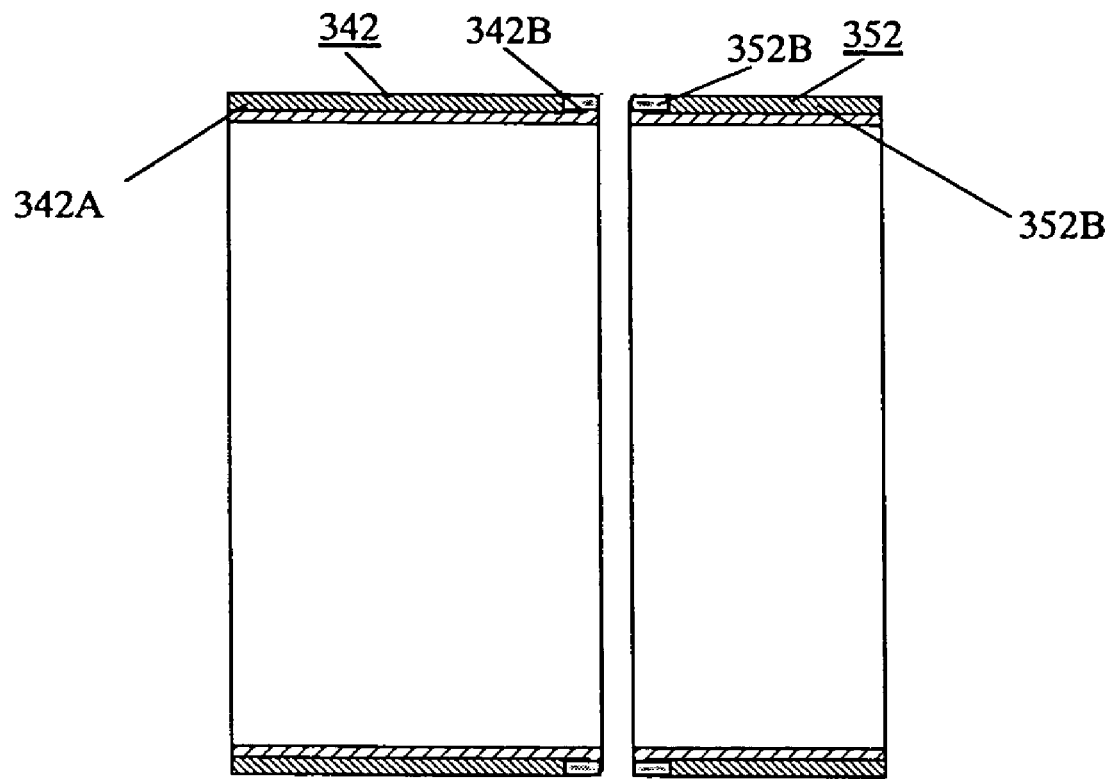
FIG. 10 is a section view of rotors included in a lens barrel of an image pickup device according to a third embodiment.

FIG. 10 is a section view of rotors included in a lens barrel of an image pickup device according to a third embodiment. Note that the image pickup device according to the third embodiment has a structure similar to that of the image pickup device 100 according to the first embodiment. In the third embodiment, only the components different from those in the first embodiment are described.

A rotor 342 is similar in structure to the rotor 142 according to the first embodiment, except that a repulsion magnet 342B having an annular shape is provided at the edge of the rotor 142 on the image side separately from the rotor magnet 342A.

The repulsion magnet 342B is provided separately from the rotor magnet 342A, and is typically implemented by a permanent magnet with the N pole being faced to the image side in a direction parallel to the optical axis.

A rotor 352 is similar in structure to the rotor 152 according to the first embodiment, except that a repulsion magnet 352B having an annular shape is provided at the edge of the rotor 152 on the subject side separately from the rotor magnet 352A.

The repulsion magnet 352B is provided separately from the rotor magnet 352A, and is typically implemented by a permanent magnet with the N pole being faced to the subject side in a direction parallel to the optical axis.

With the above-described structure, a magnetic repulsive force occurs between the repulsion magnet 342B and the repulsion magnet 352A. This repulsive force is exerted on the rotor 342 to the subject side in the direction parallel to the optical axis. Also, this repulsive force is exerted on the rotor 352 to the image side in the direction parallel to the optical axis. As such, the repulsion magnet 342B and the repulsion magnet 352B form force applying means.

As described above, the lens barrel of the image pickup device according to the third embodiment includes the force applying means that applies a force to the rotor 342 in the direction parallel to the optical axis toward the subject side. Therefore, even though the length of the bearing in the direction parallel to the optical axis is short, the rotor 342 can always be maintained at a stable position with respect to the stator 141. Thus, a high positioning accuracy of the rotor 342 can be achieved.

Similarly, the lens barrel of the image pickup device according to the third embodiment includes the force applying means that applies a force to the rotor 352 in the direction parallel to the optical axis toward the image side. Therefore, even though the length of the bearing in the direction parallel to the optical axis is short, the rotor 352 can always be maintained at a stable position with respect to the stator 151. Thus, a high positioning accuracy of the rotor 352 can be achieved.

Furthermore, the force applying means can be formed only by adding the repulsion magnets 342B and 352B having a diameter equal to the rotor magnets. Therefore, the lens barrel 130 does not have to be made large in directions parallel and perpendicular to the optical axis.

In particular, the repulsion magnets 342B and 352B forming the force applying means each have an annular shape. Therefore, a force can be uniformly applied to the entire perimeter of each rotor about the optical axis in the direction parallel to the optical axis. Thus, the rotor 142 can be maintained at a stable position with respect to the stator 141, and also the rotor 152 can be maintained at a stable position with respect to the stator 151.

Furthermore, in the lens barrel 130 of the image pickup device 100 according to the third embodiment, the force applying means for the rotor 342 and the force applying means for the rotor 352 apply forces so as to cause both of the force applying means to be away from each other. As such, each rotor can be independently stabilized in position with respect to the relevant stator.

As such, according to the lens barrel 130 of the image pickup device 100 of the third embodiment, it is possible to provide a compact lens barrel with magnetic motors including cylindrical rotors that can be positioned with high accuracy.

Fourth Embodiment

Figure 11:
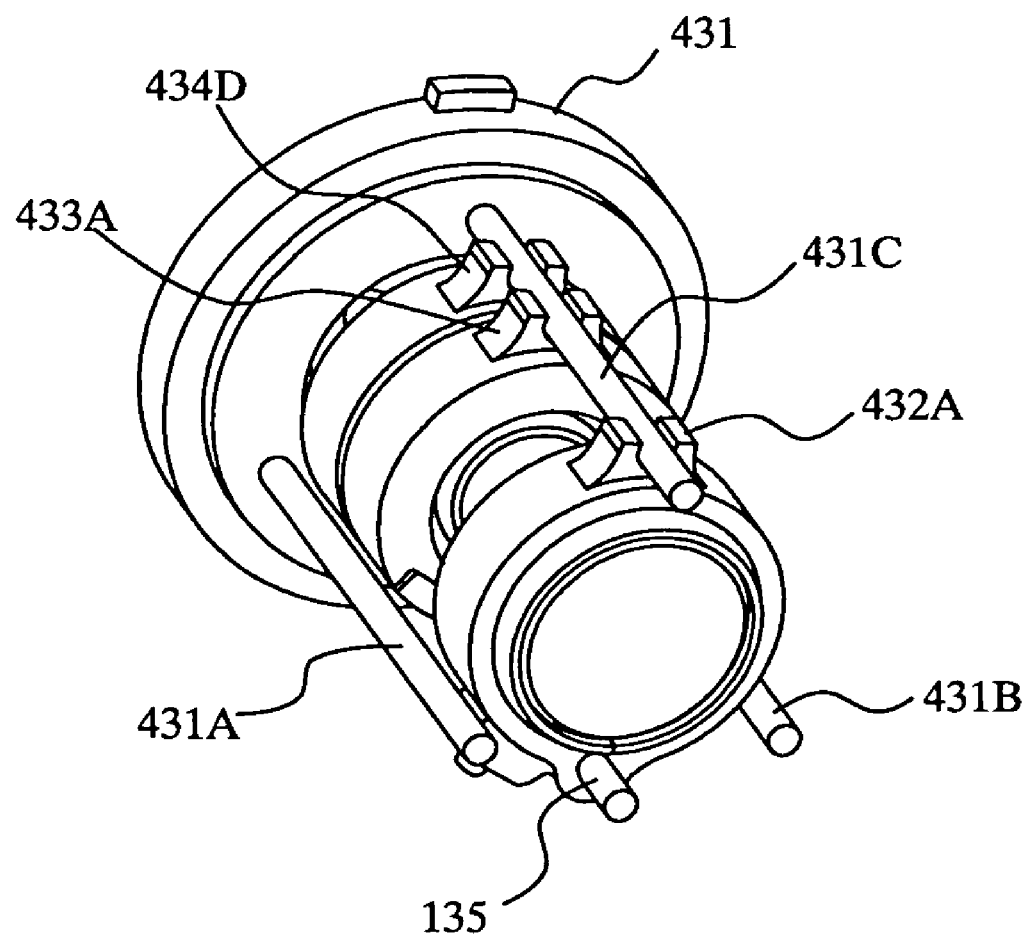
FIG. 11 is a perspective view showing substantial parts of a lens barrel of an image pickup device according to a fourth embodiment.

FIG. 11 is a perspective view showing substantial parts of a lens barrel of an image pickup device according to a fourth embodiment. Note that an image pickup device 400 according to the fourth embodiment has a structure similar to that of the image pickup device 100 according to the first embodiment and the lens barrel 130 included therein. In the fourth embodiment, only the components different from those in the first embodiment are described.

FIG. 11 illustrates a lens barrel 430 according to the fourth embodiment from which components external to the cam barrel 136 and the cam barrel 137 are removed. That is, FIG. 11 corresponds to FIG. 4 illustrating the lens barrel 130 according to the first embodiment. The lens barrel 430 according to the fourth embodiment includes a board 431 in place of the board 131 of the lens barrel 130 according to the first embodiment, and three shafts 431A, 431B, and 431C.

These three shafts 431A, 431B, and 431C are stem-shaped bodies made of stainless steel extending in a direction parallel to the optical axis 101. As with the fixed barrel 131A of the board 131, these three shafts 431A, 431B, and 431C support a first lens frame 432, a second lens frame 433, and a third lens frame 434.

The first lens frame 432 is similar in structure to the first lens frame 132 according to the first embodiment, except that a rotation regulating portion 432A is provided in place of the rotation regulating portion 132A for supporting the shaft 431A.

The second lens frame 433 is similar in structure to the second lens frame 133 according to the first embodiment, except that a rotation regulating portion 433A is provided in place of the rotation regulating portion 133A for supporting the shaft 431A.

The third lens frame 434 is similar in structure to the third lens frame 134 according to the first embodiment, except that a rotation regulating portion 434A is provided in place of the rotation regulating portion 134A for supporting the shaft 431A.

The shaft 431A is supported by the rotation regulating portion 432A of the first lens frame 432, the rotation regulating portion 433A of the second lens frame 433, and the rotation regulating portion 434A of the first lens frame 434. With this, the rotation of each lens frame is regulated so as not to freely rotate about the shaft 431A on a plane perpendicular to the optical axis 101.

The three shafts 431A, 431B, and 431B are configured such that a circumscribed circle commonly circumscribing these shafts has a diameter equal to the inner diameter of the cam barrels 136 and 137. Also, the guide shaft 135 is disposed at a position closer to the optical axis than this circumscribed circle. Therefore, a space in the lens barrel can be effectively used.

Also, compared with the fixed barrel 131A in the lens barrel 130 according to the first embodiment, three shafts 431A, 431B, and 431C made of stainless steel can decrease a coefficient of friction with each cam barrel. Therefore, these shafts serve as a bearing for each cam barrels rotating about the optical axis.

Fifth Embodiment

Figure 12:
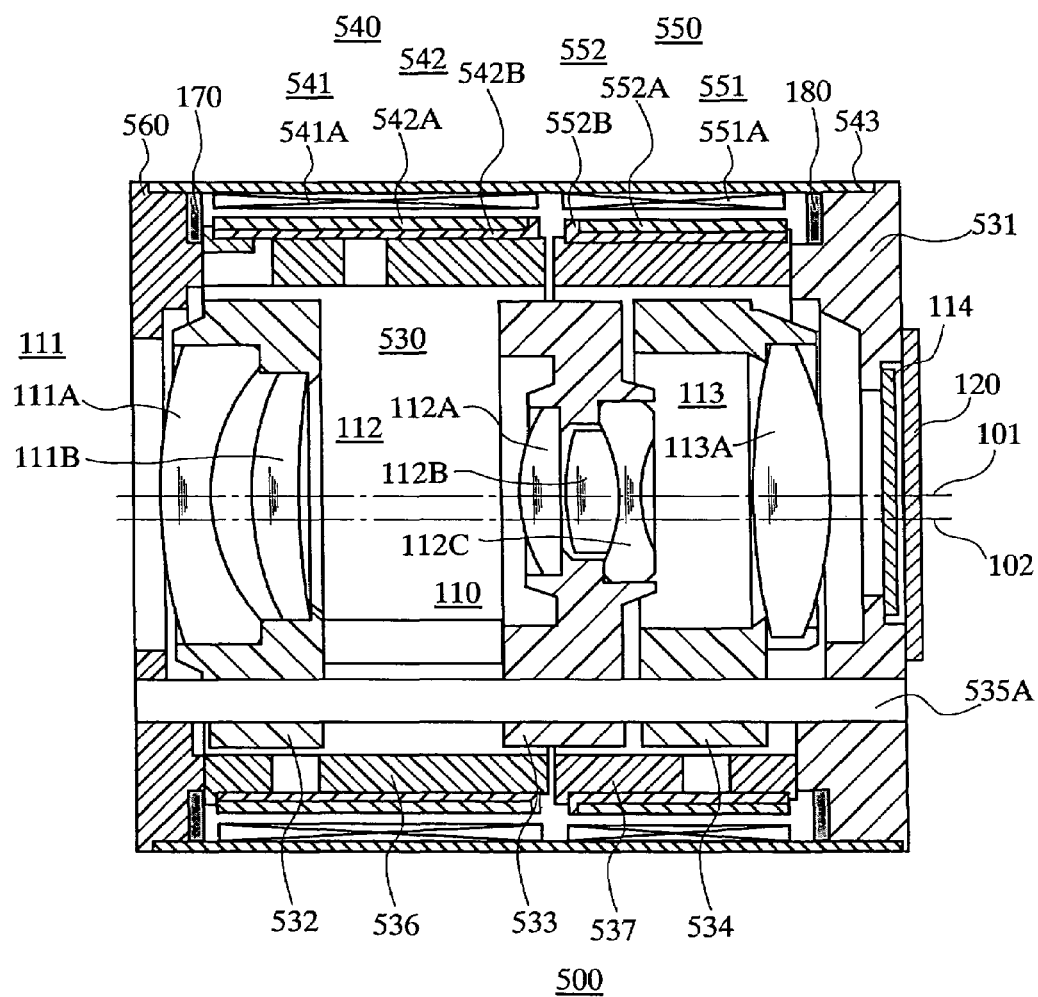
FIG. 12 is a longitudinal section view of an image pickup device according to a fifth embodiment.

FIG. 12 is a longitudinal section view of an image pickup device according to a fifth embodiment. An image pickup device 500 according to the fifth embodiment includes an image-pickup optical system 110, an image pickup sensor 120, and a lens barrel 530. Note that, in FIG. 12, components identical to those in the first embodiment are provided with the same reference numerals, and are not described herein.

The lens barrel 530 includes a board 531, a first lens frame 532, a second lens frame 533, a third lens frame 534, a guide shaft 535A, a zoom-cam barrel 536, a focus-cam barrel 537, a zoom motor 540, a focus motor 550, and a front cover 560. Also, the lens barrel 530 includes three shafts not shown in FIG. 12, that is, a bearing shaft 535B, a bearing shaft 535C, and a bearing shaft 535D.

Figure 13:
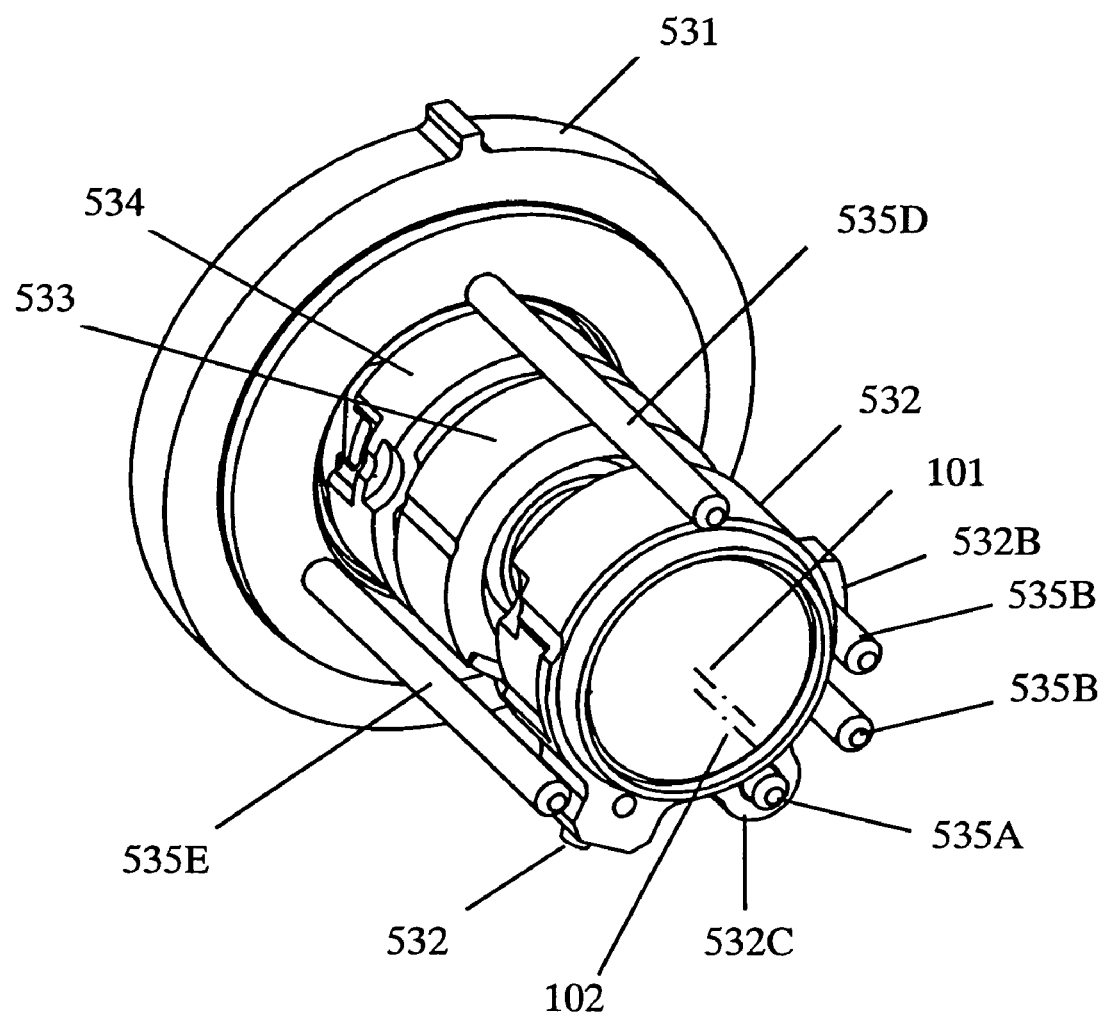
FIG. 13 is a perspective view showing a part of the image pickup device according to the fifth embodiment.

FIG. 13 is a perspective view showing a part of the image pickup device according to the fifth embodiment. FIG. 13 shows the structure of the image pickup device 500 from which the zoom-cam barrel 536, the focus-cam barrel 537, the zoom motor 540, the focus motor 550, and the front cover 560 are removed.

In FIGS. 12 and 13, the board 531 has a disk-like shape perpendicular to the optical axis 101. The board 531 has a rectangular opening at the center, and supports, in the order closest from the subject side, the low-pass filter 114 and the image pickup sensor 120. Also, the board 531 supports a guide shaft 535A and the bearing shafts 535B through 535D.

The first lens frame 532 supports the first zoom lens group 111. The first lens frame 532 has an approximately cylindrical shape with the optical axis 101 being taken as a center axis. The first lens frame 532 is provided on its perimeter with a cam pin 532A, a rotation regulating portion 532B, and a through hole 532C facing in a direction parallel to the optical axis 101. The cam pin 532A engages in a cam groove, not shown, provided to the zoom-cam barrel 536. The rotation regulating portion 532B engages in the bearing shaft 535B with subtle play formed in a direction perpendicular to the optical axis 101. The guide shaft 535A is fitted in the through hole 532C.

The second lens frame 533 holds the second zoom lens group 512. The second lens frame 533 has an approximately cylindrical shape with the optical axis 101 being taken as a center axis. The second lens frame 533 is similar in structure to the first lens frame 532. That is, the second lens frame 533 is provided on its perimeter with a cam pin (not shown) protruding in an outer surface direction, a rotation regulating portion (not shown), and a through hole (not shown) facing to a direction parallel to the optical axis 101. The camp in engages with a cam groove, not shown, provided to the zoom-cam barrel 536. The rotation regulating portion engages in the bearing shaft 535B. The through hole is used to hold the guide shaft 535A by allowing penetration.

The third lens frame 534 holds the focus lens group 113. The third lens frame 534 has an approximately cylindrical shape. The third lens frame 534 is similar in structure to the first lens frame 532. That is, the third lens frame 534 is provided on its perimeter with a cam pin (not shown) protruding in an outer surface direction, a rotation regulating portion (not shown), and a through hole (not shown) facing to a direction parallel to the optical axis 101. The cam pin engages in a cam groove, not shown, provided to the focus-cam barrel 537. The rotation regulating portion engages in the bearing shaft 535B. The through hole is used to hold the guide shaft 535A by allowing penetration.

The zoom-cam barrel 536 and the focus-cam barrel 537 each have a cylindrical shape. The zoom-cam barrel 536 and the focus-cam barrel 537 have a center axis 102 shared in common, and can rotate about this center axis 102. The center axis 102 is at the center of a circumscribed circle formed by the three bearing shafts 535B through 535D on a plane perpendicular to the optical axis. That is, the three bearing shafts 535B through 535D serve as a rotation axis bearing of the zoom-cam barrel 536 and the focus-cam barrel 537. Here, the optical axis 101 of the image pickup optical system 110 does not coincide with the center axis 102.

Around the perimeter of the zoom-cam barrel 536 and the focus cam 537, a zoom motor 540 and a focus motor 550 are provided. The zoom motor 540 includes a stator 541 and a rotor 542. The stator 541 includes a lens body 543 serving as a stator yoke, and a stator coil 541A. The rotor 542 includes a rotor magnet 542A and a rotor yoke 542B.

The focus motor 550 includes a stator 551 and a rotor 552. The stator 551 includes the lens body 543 serving as a stator yoke shared by the zoom motor 540 and a stator coil 551A. The rotor 552 includes a rotor magnet 552A and a rotor yoke 552B.

Figure 14:
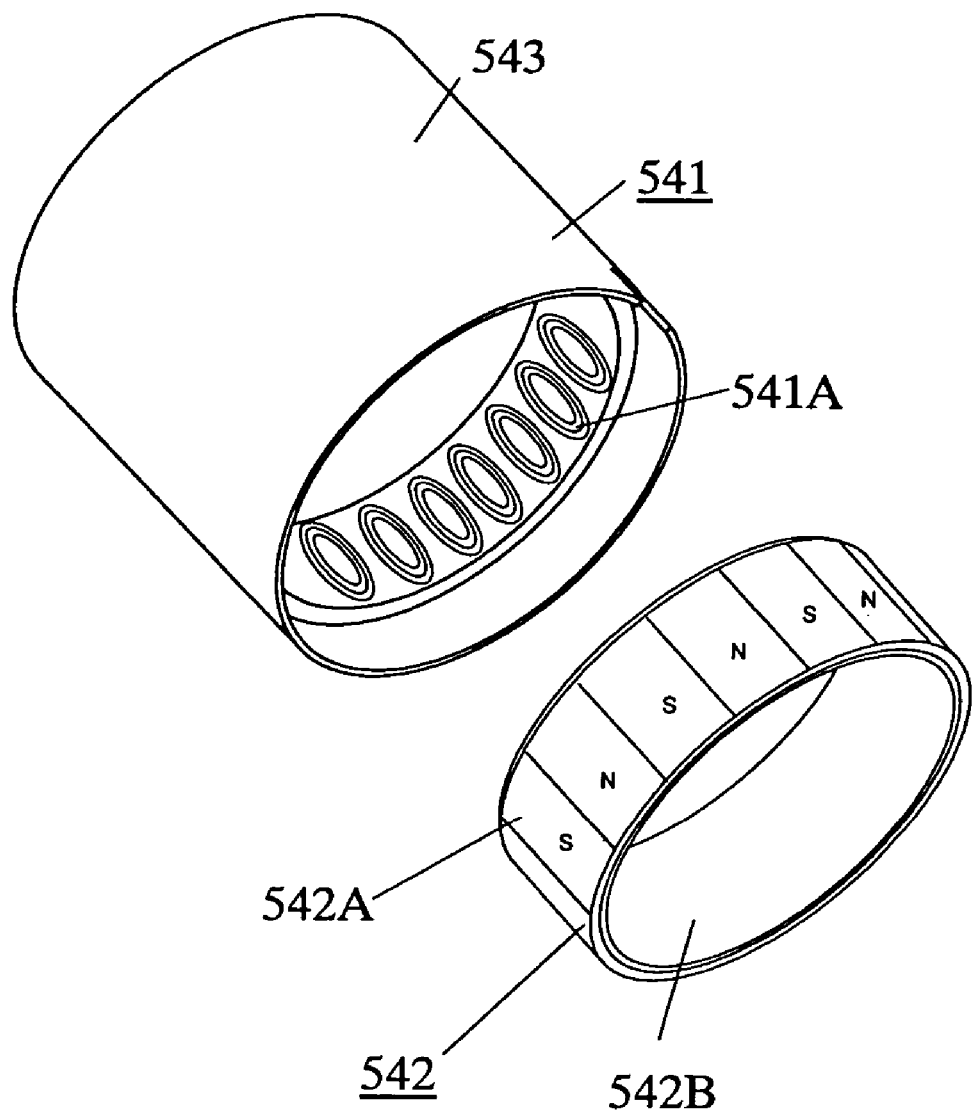
FIG. 14 is an exploded perspective view of a zoom motor of the image pickup device according to the fifth embodiment.

FIG. 14 is an exploded perspective view of the zoom motor of the image pickup device according to the fifth embodiment. In FIGS. 12 and 14, the lens body 543 has a cylindrical shape formed about the center axis 102. The lens body 543 is typically implemented by a ferromagnetic body, such as an flat-rolled magnetic steel sheet, and is a fixed barrel held by the board 131 and the front cover 560, which will be described further below.

The stator coil 541A fixed to the inner surface of the lens body 543 is formed so that a plurality of spirally-wound small coils are disposed at a predetermined pitch along the inner surface of the lens body 543. The rotor magnet 542A is typically implemented by a permanent magnet having magnetic poles as many as the number of small coils of the stator coil 541A. The magnetic poles are disposed in a manner such that N poles and S poles are alternately disposed along the perimeter of the rotor yoke 542B. The rotor yoke 542B is typically implemented by a ferromagnetic body, such as a flat-rolled magnetic steel sheet, and is disposed between the rotor magnet 542A and the zoom-cam barrel 536.

The lens body 543 serving as a stator yoke, the stator coil 541A, the rotor magnet 542A, and the rotor yoke 542B form a magnetic circuit. In the zoom motor 540, the magnetic circuit is driven by an electric current externally applied at a predetermined timing to the small coils of the stator coil 541A, thereby causing the rotor magnet 542A and the rotor yoke 542B to rotate and serve as an electromagnetic motor.

The focus motor 550 has a structure similar to that of the zoom motor 540 shown in FIG. 14.

That is, the stator coil 551A fixed to the inner surface of the lens body 543 is formed so that a plurality of spirally-wound small coils are disposed at a predetermined pitch along the inner surface of the lens body 543. The rotor yoke 552B is adhered to the outer surface of the focus-cam barrel 537. The rotor yoke 552B is typically formed of a ferromagnetic body, such as a flat-rolled magnetic steel sheet.

The rotor magnet 552A is adhered to the perimeter of the rotor yoke 552B. The rotor magnet 552A is typically implemented by a permanent magnet having magnetic poles as many as the number of small coils of the stator coil 551A. The magnetic poles are disposed in a manner such that N poles and S poles are alternately disposed along the perimeter of the rotor yoke 552B.

The stator 551 including the lens body 543 serving as a stator yoke and the stator coil 551A, the rotor magnet 552A, and the rotor yoke 552B form a magnetic circuit of the focus motor 550. In the focus motor 550, the magnetic circuit is driven by a current externally applied at a predetermined timing to the small coils of the stator coil 551A, thereby causing the rotor magnet 552A and the rotor yoke 542B to rotate and serve as an electromagnetic motor.

In FIG. 12, the front cover 560 has a disk shape perpendicular to the optical axis 101. The front cover 560 is fixed to a side of the image pickup device 500 closest to the subject. The front cover 560 has a through hole for supporting the guide shaft 535A.

One edge of the lens body 543 on the subject side is supported by the front cover 560. The other edge of the lens body 543 on the image side is supported by the board 531. With the lens body 543 being supported by the front cover 560 and the board 531, the space between the stator coil 541A and the rotor magnet 542A and the space between the stator coil 551A and the rotor magnet 552A are appropriately maintained.

The ferromagnetic plates 170 and 180 have a structure similar to those described in the first embodiment. With this structure, as with the first embodiment, magnetic attraction occurs between the ferromagnetic plate 170 and the rotor magnet 542A of the rotor 542. With this magnetic attraction, a force is always applied to the rotor 542 in the direction parallel to the optical axis 101 toward the subject side. That is, the rotor magnet 542A and the ferromagnetic plate 170 form means that applies force on the rotor 542.

Also, as with the first embodiment, magnetic attraction occurs between the ferromagnetic plate 180 and the rotor magnet 552A of the rotor 552. With this magnetic attraction, a force is always applied to the rotor 552 in the direction parallel to the optical axis 101 toward the image side. That is, the rotor magnet 552A and the ferromagnetic plate 170 form means that applies force on the rotor 552.

In this manner, the rotor 542 is applied with a force toward the subject side, while the rotor 552 is applied with a force toward the image side. That is, the rotor 542 is applied with a force in a direction away from the rotor 552.

In the above-described structure, when zooming is performed, a driving current is externally applied to the small coils of the stator coil 541A of the zoom motor 540 at a predetermined timing. With the driving current being applied, the magnetic circuit is driven to cause the rotor 542 to rotate about the center axis 102.

With the rotor 542 rotating about the center axis 102, the zoom-cam barrel 536 rotates about the center axis 102. With the zoom-cam barrel 536 rotating about the center axis 102, the cam pin 532A provided on the first lens frame 532 is guided along the cam groove in which the cam pin 532A is fitted. Also, with the zoom-cam barrel 536 rotating about the optical axis, the cam pin provided on the second lens frame 533 is guided along the cam groove in which the cam pin is fitted.

The first lens frame 532 is guided by the guide shaft 535A so as to move in a direction parallel to the optical axis 101. At this time, since the rotation regulating portion 532B engages in the bearing shaft 535B, the first lens frame 532 is regulated so as not to freely rotate about the guide shaft 535A on a plane perpendicular to the optical axis 101. Therefore, when the zoom-cam barrel 536 rotates about the optical axis, the rotating motion is converted to a straight-ahead motion, thereby causing the first lens frame 532 to move in a direction parallel to the optical axis in accordance with the phase of the cam groove. That is, the cam groove of the zoom-cam barrel 536 and the cam pin 532A of the first lens frame 532 form a converting mechanism.

Also, similarly, with the engagement of the rotation regulating portion and the bearing shaft 535B, the second lens frame 533 is regulated so as not to freely rotate about the guide shaft 535A on a plane perpendicular to the optical axis 101. Therefore, when the zoom-cam barrel 536 rotates about the optical axis, the rotating motion is converted to a straight-ahead motion, thereby causing the second lens frame 533 to move in a direction parallel to the optical axis in accordance with the phase of the cam groove.

With the first lens frame 532 and the second lens frame 533 moving, the first zoom lens group 111 and the second zoom lens group 112 move, while changing a space therebetween, to each predetermined position in a direction parallel to the optical axis. As a result, the image pickup device 500 can perform zooming.

When focusing is performed, a driving current is externally applied to the small coils of the stator coil 551A of the focus motor 550 at a predetermined timing. With the driving current being applied, the magnetic circuit is driven to cause the rotor 552 to rotate about the optical axis.

With the rotor 552 rotating about the optical axis, the focus-cam barrel 537 also rotates about the optical axis. With the focus-cam barrel 537 rotating about the optical axis, the cam pin provided on the third lens frame 534 is guided along the cam groove in which the cam pin is fitted.

With the engagement of the rotation regulating portion and the bearing shaft 535B, the third lens frame 534 is regulated so as not to freely rotate about the guide shaft 535A on a plane perpendicular to the optical axis 101. Therefore, when the focus-cam barrel 537 rotates about the optical axis, the rotating motion is converted to a straight-ahead motion, thereby causing the third lens frame 534 to move in a direction parallel to the optical axis in accordance with the phase of the cam groove.

Figure 15:
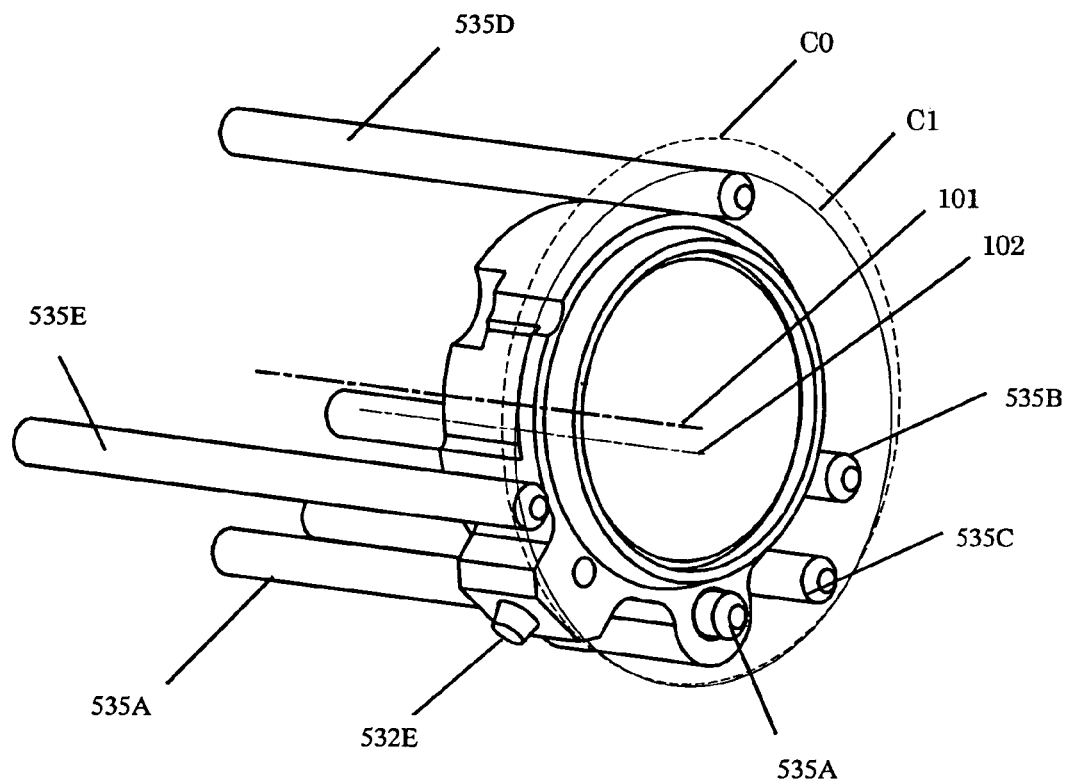
FIG. 15 is a perspective view of a lens barrel of the image pickup device according to the fifth embodiment for describing a positional relation among a first lens frame, a guide shaft, and three bearing shafts.
Figure 16:
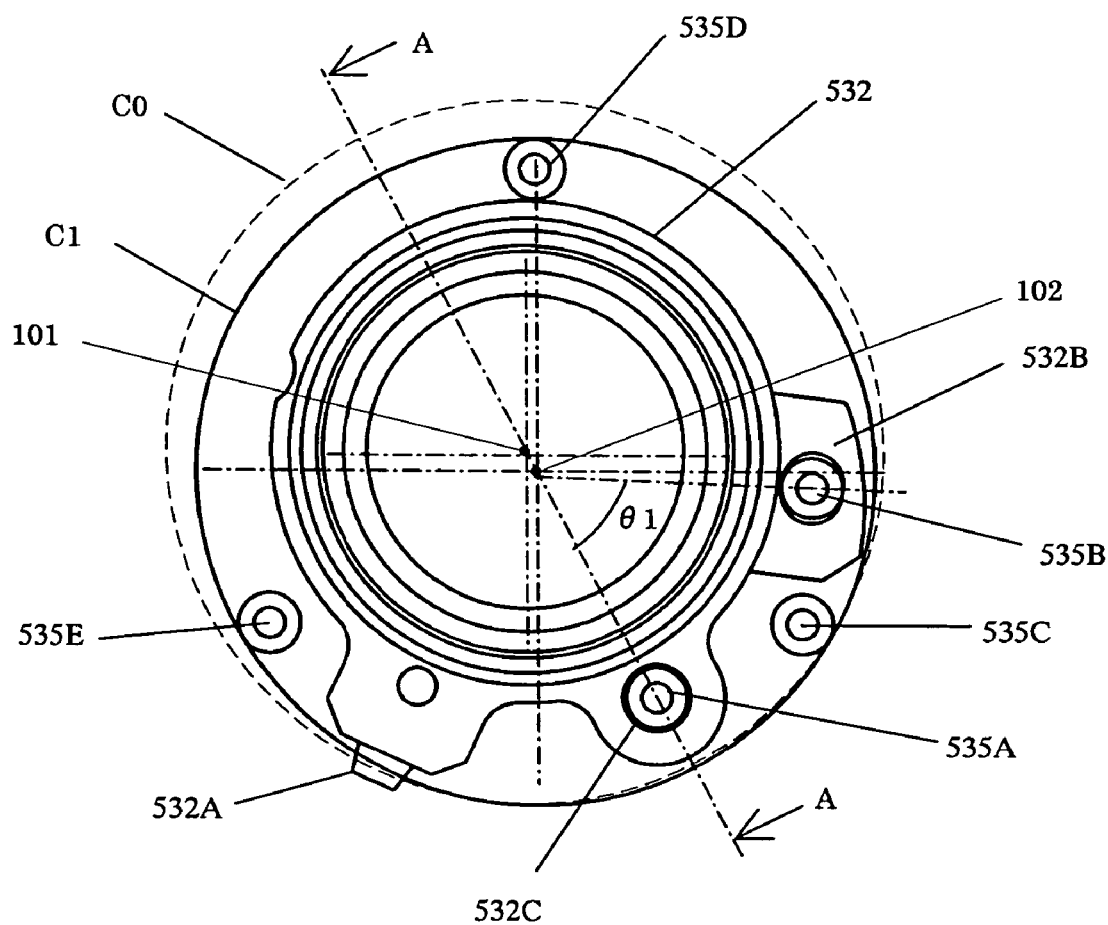
FIG. 16 is a front view of the lens barrel of the image pickup device according to the fifth embodiment for describing the positional relation among the first lens frame, the guide shaft, and the three bearing shafts.

FIG. 15 is a perspective view of the lens barrel of the image pickup device according to the fifth embodiment for describing a positional relation among the first lens frame, the guide shaft, and the three bearing shafts. FIG. 16 is a front view of the lens barrel of the image pickup device according to the fifth embodiment for describing the positional relation among the first lens frame, the guide shaft, and the three bearing shafts. Note that, in FIG. 16, an A—A section corresponds to the section view in FIG. 12.

In FIGS. 15 and 16, the three bearing shafts 535B through 535D define a circumscribed circle C1. The circumscribed circle C1 has a diameter corresponding to the inner diameter of the zoom-cam barrel 536. On the other hand, a virtual circle C0 has a diameter corresponding to the inner diameter of a zoom-cam barrel required when the optical axis 101 coincides with the center axis 102 of the lens body 543, which is a fixed barrel, by taking a point of contact of the bearing shaft 535B as a reference.

As can be seen from FIGS. 15 and 16, in the lens barrel according to the fifth embodiment, the diameter of the circumscribed circle C1 is shorter than the diameter of the virtual circle C0. That is, in the lens barrel according to the fifth embodiment, the optical axis 101 and the center axis 102 of the lens body 543, which is a fixed barrel, do not coincide with each other, but are deflected from each other in parallel. With this, the front surface of the zoom-cam barrel 536 can be made compact.

Also, in the lens barrel according to the fifth embodiment, a central angle θ1 formed by the guide shaft 535A and the bearing shaft 535B, and the center axis 102 is less than 180 degrees. Therefore, a deflection amount between the optical axis 101 and the center axis 102 of the lens body 543, which is a fixed barrel, is significantly large. Therefore, the front surface of the zoom-cam barrel 536 can be made compact compared with that of the conventional lens barrel, particularly in a direction perpendicular to the optical axis.

With the zoom-cam barrel 536 being made small, the fixed barrel and other components disposed on the perimeter of the zoom-cam barrel 536 can also be made small.

Therefore, the entire lens barrel can be downsized. Also, in the lens barrel according to the fifth embodiment, the central angle θ1 formed by the guide shaft 535A and the bearing shaft 535B, and the center axis 102 is not more than 90 degrees. Therefore, a deflection amount is significantly large.

As described above, the lens barrel 530 of the image pickup device 500 according to the fifth embodiment includes the force applying means that applies a force to the rotor 542 of the zoom motor 540 in the direction parallel to the optical axis toward the subject side. Therefore, even though the length of the bearing in the direction parallel to the optical axis is short, the rotor 542 can always be maintained at a stable position with respect to the stator 541. Thus, a high positioning accuracy of the rotor 542 can be achieved.

Similarly, the lens barrel 530 of the image pickup device 500 according to the fifth embodiment includes the force applying means that applies a force to the rotor 552 of the focus motor 550 in the direction parallel to the optical axis toward the image side. Therefore, even though the length of the bearing in the direction parallel to the optical axis is short, the rotor 552 can always be maintained at a stable position with respect to the stator 551. Thus, a high positioning accuracy of the rotor 152 can be achieved.

In the lens barrel 530 of the image pickup device 500 according to the fifth embodiment, the force applying means for the rotor 542 and the force applying means for the rotor 552 apply forces so as to cause both of the force applying means to be away from each other. As such, each rotor can be independently stabilized in position with respect to the relevant stator.

Also, in the lens barrel 530 of the image pickup device 500 according to the fifth embodiment, the optical axis 101 and the center axis 102 of the lens body 543 do not coincide with each other, but are deflected from each other in parallel. Therefore, compared with the first embodiment, the lens barrel 530 can be made small in a direction perpendicular to the optical axis 101.

Other Embodiments

The embodiments described above can be modified in various manners.

In each of the above-described embodiments, the lens barrel exemplarily includes two electromagnetic motors, that is, a zoom motor and a focus motor. This is not meant to be restrictive. Only a zoom motor may be provided in the case of so-called pan focusing in which the image pickup device only has a function of zooming and its focusing is set at a fixed limited shooting distance.

Conversely, only a focus motor may be provided in the case where the image pickup device does not have a function of zooming and only focusing is performed with a single-focus lens.

In accordance with the state of movement of the lenses at the time of zooming, the number of lens groups driven by the zoom motor may be one, or three or more. Similarly, in accordance with the state of movement of the lens at the time of focusing, the number of lens groups driven by the focus motor may be one, or three or more.

Also, the converting mechanism and the moving mechanism of the lens barrel in the above-described embodiments each include a rotation cam barrel and a straight-ahead lens frame. This is not meant to be restrictive. The mechanism may include a rotational cam barrel and a rotational lens frame connected thereto, or may include a rotational barrel and a rotational lens frame connected thereto with screws.

Furthermore, the force applying means may be modified as appropriate. For example, as with the first embodiment, another attraction magnet may be provided to the rotor separately from the rotor magnet so as to be opposite to the ferromagnetic plate.

Still further, in place of the ferromagnetic plate, a permanent magnet may be provided so that the attraction magnet and the magnetic pole are opposite in polarity, thereby producing a force.

Still further, in place of the ferromagnetic plate, a permanent magnet may be provided so as to attract the rotor yoke, thereby producing a force.

Still further, the ferromagnetic plate, the repulsion magnet, and the attraction magnet may not have a annular shape formed around the entire perimeter about the optical axis. For example, three small ferromagnetic plates may be provided at every 120 degrees, for example, so as to be opposite to the rotor. Alternatively, four small ferromagnetic plates may be provided at every 90 degrees so as to be opposite to the rotor. As such, forces may be discretely applied.

However, even if forces are discretely applied, it is desirable that the force applying means be disposed at a predetermined pitch so that forces are uniformly applied to the entire perimeter about the optical axis. It is also desirable that discretely-produced forces be uniform in the direction parallel to the optical axis.

Still further, in the electromagnetic motor of the lens barrel of each embodiment, the stator includes a stator coil, and the rotor includes a rotor magnet. This is not meant to be restrictive. The electromagnetic motor may be configured such that the stator includes a stator magnet, and the rotor includes a rotor coil, wherein an electric current is supplied to the rotor side.

With the above-structured electromagnetic motor, the moment of inertia of the rotor can be reduced, thereby improving rotation control characteristics, such as positioning accuracy. However, compared with the structure of the first embodiment, the structure allowing a driving current to be coupled to the rotor coil is complex. Therefore, either one of the structures is selected according to a desired characteristic.

The lens barrel and the image pickup device are suitable for digital still cameras, digital video cameras, cellar phones and PDAs with a camera function, and the like, which are desired to be downsized and advanced in function.

While the novel concepts have been described in detail, the foregoing description is in all aspects illustrative and not restrictive. It is understood that numerous other modifications and variations can be devised without departing from the scope of the invention.

What is claimed is:

1. A lens barrel for holding at least one lens group, comprising:
   a first lens frame for supporting a first lens group;
   an first electromagnetic motor including a first cylindrical stator with an axis parallel to an optical axis being taken as a center axis and a first cylindrical rotor that is coaxial with the first cylindrical stator and rotates about the center axis with respect to the first cylindrical stator;
   a first cam or rotational barrel operatively connected to the first lens frame for converting a rotating motion of the first cylindrical rotor to a linear motion for moving the first lens frame and first lens group in a direction parallel to the optical axis; and
   a first ferromagnetic material and a second ferromagnetic material positioned relative to opposing ends of the first cylindrical rotor for applying magnetic forces to the first cylindrical rotor in the direction parallel to the optical axis.

2. The lens barrel according to claim 1, further comprising:
   a rotor magnet provided to the first cylindrical rotor positioned such that a magnetic force of attraction is formed between the first ferromagnetic material and the rotor magnet and between the second ferromagnetic material and the rotor magnet.

3. The lens barrel according to claim 2, wherein the first ferromagnetic material and the second ferromagnetic material are ferromagnetic plates.

4. The lens barrel according to claim 3, wherein the rotor magnet is cylindrically shaped, and the ferromagnetic plates constituting the first ferromagnetic material and the second ferromagnetic material has an annular shape.

5. The lens barrel according to claim 2, wherein the first cylindrical stator includes a cylindrical stator yoke that is coaxial with the rotor, and the cylindrical stator yoke includes an annulus extending inwardly relative to an edge of the rotor magnet.

6. The lens barrel according to claim 1, wherein the first cylindrical stator includes a cylindrical stator yoke that is coaxial with the rotor, and a notch formed in the cylindrical stator yoke at a position relative to an edge of the rotor magnet.

7. The lens barrel according to claim 1, wherein the first ferromagnetic material and the second ferromagnetic material applies the magnetic force uniformly to a perimeter of respective opposing ends of the first cylindrical rotor.

8. The lens barrel according to claim 1, wherein the first cylindrical rotor is positioned closer to the first ferromagnetic material than the second ferromagnetic material.

9. The lens barrel according to claim 1, further comprising:
   a second frame for supporting a second lens groups;
   a second electromagnetic motor including a cylindrical second stator with the optical axis being taken as the center axis and a second cylindrical rotor that is coaxial with the second stator and rotates about the center axis with respect to the second stator; and
   a second cam or rotational barrel for converting a rotating motion of the second rotor to a linear motion for moving the second frame and the second lens group in the direction parallel to the optical axis, wherein
   the first ferromagnetic material is disposed relative to an end of the first rotor for applying a first magnetic force to the first rotor in the direction parallel to the optical axis, and
   the second ferromagnetic material is disposed relative to an end of the second rotor for applying a second magnetic force to the second rotor in the direction parallel to the optical axis.

10. The lens barrel according to claim 9, wherein the first ferromagnetic material and the second ferroelectric material respectively apply a first magnetic force and a second magnetic force to the first rotor and the second rotor in different directions.

11. The lens barrel according to claim 9, further comprising:
a cylindrical lens body that is coaxial with the first rotor and the second rotor, wherein
the cylindrical lens body serves as a stator yoke shared in common by the first stator and the second stator.

12. The lens barrel according to claim 11, wherein
the first rotor includes a cylindrical first rotor magnet,
the second rotor includes a cylindrical second rotor magnet, and
a notch is formed in the stator yoke relative to an end of the first rotor magnet and an end of the second rotor magnet adjacent to the end of the first rotor magnet.

13. The lens barrel according to claim 12, wherein the notch is configured for reducing a magnetic flux density between the stator yoke and the rotor magnet.

14. The lens barrel according to claim 9, wherein
the first ferromagnetic material applies the first magnet force uniformly to a perimeter of the first rotor about the optical axis, and the second ferromagnetic material applies the second magnetic force uniformly to a perimeter of the second rotor about the optical axis.

15. The lens barrel according to claim 1, wherein
the first ferromagnetic material is a first repulsion magnet,
the second ferromagnetic material is a second repulsion magnet, and
the first repulsion magnet and the second repulsion magnet are oriented such that magnetic poles identical in polarity of the first repulsion magnet and the second repulsion magnet face each other.

16. An image pickup device that outputs an electrical image signal representing an optical image of a subject, comprising:
an image pickup optical system including a first lens group for forming the optical image of the subject;
an image pickup sensor for receiving the optical image formed by the image pickup optical system and converting the optical image to the electrical image signal; and
a lens barrel for holding the first lens group, wherein
the lens barrel includes:
a first lens frame for supporting a first lens group;
an first electromagnetic motor including a first cylindrical stator with an axis parallel to an optical axis being taken as a center axis and a first cylindrical rotor that is coaxial with the first cylindrical stator and rotates about the center axis with respect to the first cylindrical stator,
a first cam or rotational barrel operatively connected to the first lens frame for converting a rotating motion of the first cylindrical rotor to a linear motion for moving the first lens frame and first lens group in a direction parallel to the optical axis, and
a first ferromagnetic material and a second ferromagnetic material positioned relative to opposing ends of the first cylindrical rotor for applying magnetic forces to the first cylindrical rotor in the direction parallel to the optical axis.

17. The image pickup device according to claim 16, further comprising:
a rotor magnet provided to the first cylindrical rotor positioned such that a magnetic force of attraction is formed between the first ferromagnetic material and the rotor magnet and the second ferromagnetic material and the rotor magnet.

18. The image pickup device according to claim 17, wherein
the first cylindrical stator includes a cylindrical stator yoke that is coaxial with the rotor, and
a notch formed in the cylindrical stator yoke at a position relative to an edge of the rotor magnet.

19. The image pickup device according to claim 18, wherein the notch is configured to reduce a magnetic flux density between the stator yoke and the rotor magnet.

20. The image pickup device according to claim 16, wherein
the first lens group is a zoom lens group that moves along the direction parallel to the optical axis for performing zooming of an image pickup optical system.

21. The image pickup device according to claim 16, wherein
the first lens group is a focus lens group that moves along the direction parallel to the optical axis for performing focusing of an image pickup optical system.

22. The image pickup device according to claim 16, wherein
the image pickup optical system further includes a second lens group for forming the optical image of the subject,
the lens barrel is for holding the first lens group and a second lens group as sharing an optical axis, and
the lens barrel further comprises:
a second frame for supporting a second lens groups;
a second electromagnetic motor including a cylindrical second stator with the optical axis being taken as the center axis and a second cylindrical rotor that is coaxial with the second stator and rotates about the center axis with respect to the second stator; and
a second cam or rotational barrel for converting a rotating motion of the second rotor to a linear motion for moving the second frame and the second lens group in the direction parallel to the optical axis, wherein
the first ferromagnetic material is disposed relative to an end of the first rotor for applying a first magnetic force to the first rotor in the direction parallel to the optical axis, and
the second ferromagnetic material is disposed relative to an end of the second rotor for applying a second magnetic force to the second rotor in the direction parallel to the optical axis.

23. The image pickup device according to claim 22, wherein
the first ferromagnetic material and the second ferroelectric material respectively apply first and second magnetic forces to the first rotor and the second rotor in different directions.

24. The image pickup device according to claim 22, wherein
the lens barrel is a cylindrical lens body that is coaxial with the first rotor and the second rotor, and
the lens body serves as a stator yoke shared in common by the first stator and the second stator.

25. The image pickup device according to claim 24, wherein
the first rotor includes a cylindrical first rotor magnet,
the second rotor includes a cylindrical second rotor magnet,
a notch is formed in the lens barrel relative to an end of the first rotor magnet and an end of the second rotor magnet adjacent to the end of the first rotor magnet.

26. The image pickup device according to claim 25, wherein the notch is configured for reducing a magnetic flux density between the stator yoke and the rotor magnet.

27. The image pickup device according to claim 22, wherein
the first ferromagnetic material is a first repulsion magnet,
the second ferromagnetic material is a second repulsion magnet, and
the first repulsion magnet and the second repulsion magnet are oriented such that magnetic poles identical in polarity of the first repulsion magnet and the second repulsion magnet face each other.

28. The image pickup device according to claim 22, wherein
the first lens group is a zoom lens group that moves along the direction parallel to the optical axis for performing zooming of an image pickup optical system, and
the second lens group is a focus lens group that moves along the direction parallel to the optical axis for performing focusing of an image pickup optical system.

29. A lens barrel for holding at least one lens group, comprising:
a first lens frame for supporting a first lens group;
an first electromagnetic motor including a first cylindrical stator with an axis parallel to an optical axis being taken as a center axis and a first cylindrical rotor that is coaxial with the first cylindrical stator and rotates about the center axis with respect to the stator;
first converting means for converting a rotating motion of the first cylindrical rotor to a linear motion for moving the first lens frame and first lens group in a direction parallel to the optical axis; and
first force applying means and second force applying means for applying forces to the first cylindrical rotor in the direction parallel to the optical axis.

30. The lens barrel according to claim 29, further comprising:
a rotor magnet provided to the first cylindrical rotor positioned such that a magnetic force of attraction is formed between the first force applying means and the rotor magnet and between the second force applying means and the rotor magnet.

31. The lens barrel according to claim 30, wherein
the first force applying means and the second force applying means are ferromagnetic plates.

32. The lens barrel according to claim 31, wherein
the rotor magnet is cylindrically shaped, and
the ferromagnetic plates constituting the first force applying means and the second force applying means has an annular shape.

33. The lens barrel according to claim 30, wherein
the first cylindrical stator includes a cylindrical stator yoke that is coaxial with the rotor, and
the cylindrical stator yoke includes an annulus extending inwardly relative to an edge of the rotor magnet.

34. The lens barrel according to claim 30, wherein
the first cylindrical stator includes a cylindrical stator yoke that is coaxial with the rotor, and
a notch formed in the cylindrical stator yoke at a position relative to an edge of the rotor magnet.

35. The lens barrel according to claim 34, wherein
the first force applying means and the second force applying means applies the force uniformly to a perimeter of respective opposing ends of the first cylindrical rotor.

36. The lens barrel according to claim 29, wherein
the first cylindrical rotor is positioned closer to the first force applying means than the second force applying means.

37. The lens barrel according to claim 29, further comprising:
a second frame for supporting a second lens groups;
a second electromagnetic motor including a cylindrical second stator with the optical axis being taken as the center axis and a second cylindrical rotor that is coaxial with the second stator and rotates about the center axis with respect to the second stator; and
second converting means for converting a rotating motion of the second rotor to a linear motion for moving the second frame and the second lens group in the direction parallel to the optical axis, wherein
the first force applying means is disposed relative to an end of the first rotor for applying a first force to the first rotor in the direction parallel to the optical axis, and
the second force applying means is disposed relative to an end of the second rotor for applying a second force to the second rotor in the direction parallel to the optical axis.

38. The lens barrel according to claim 37, wherein
the first force applying means and the second force applying means respectively apply first and second forces to the first rotor and the second rotor in different directions.

39. The lens barrel according to claim 37, further comprising:
a cylindrical lens body that is coaxial with the first rotor and the second rotor, wherein
the cylindrical lens body serves as a stator yoke shared in common by the first stator and the second stator.

40. The lens barrel according to claim 37, wherein
the first rotor includes a cylindrical first rotor magnet,
the second rotor includes a cylindrical second rotor magnet, and
a notch is formed in the lens barrel relative to an end of the first rotor magnet and an end of the second rotor magnet adjacent to the end of the first rotor magnet.

41. The lens barrel according to claim 40, wherein the notch is configured for reducing a magnetic flux density between the stator yoke and the rotor magnet.

42. The lens barrel according to claim 29, wherein
the first force applying means is a first repulsion magnet,
the second force applying means is a second repulsion magnet, and
the first repulsion magnet and the second repulsion magnet are oriented such that magnetic poles identical in polarity of the first repulsion magnet and the second repulsion magnet face each other.

43. The lens barrel according to claim 29, wherein
the first force applying means applies the first magnet force uniformly to a perimeter of the first rotor about the optical axis, and the second force applying means applies the second magnetic force uniformly to a perimeter of the second rotor about the optical axis.

* * * * *